United States Patent [19]

Ribera et al.

[11] 4,282,400

[45] Aug. 4, 1981

[54] SIGNALING UNIT FOR INTERCHANGE OF DATA WITH MULTIPOINT LINE SELECTION UNITS AND DATA TERMINALS

[75] Inventors: John F. Ribera, Jackson, N.J.; Walter R. Schaefer, Fremont, Calif.; Robert R. Seibel, Barnegat, N.J.

[73] Assignee: Bell Telephone Laboratories, Incorporated, Murray Hill, N.J.

[21] Appl. No.: 124,660

[22] Filed: Feb. 25, 1980

[51] Int. Cl.³ .................... H04H 9/00; H04L 25/20; H04J 3/08
[52] U.S. Cl. ........................................ 178/73; 370/93
[58] Field of Search ................. 179/175.31 R, 170 J, 179/170 R, 18 EA; 178/3, 69 G, 73, 2 R; 340/147 R, 147 LP, 151, 152; 370/26, 42, 43, 54, 60, 92, 93

[56] References Cited

U.S. PATENT DOCUMENTS

| 4,019,176 | 4/1977 | Cour et al. | 370/89 |
| 4,096,355 | 6/1978 | Rothauser et al. | 370/93 |
| 4,122,301 | 10/1978 | Kolensky et al. | 178/73 |

Primary Examiner—Thomas A. Robinson
Attorney, Agent, or Firm—Roy C. Lipton

[57] ABSTRACT

A subscriber at a remote location is provided the capability of configuring a multipoint private line network composed of multipoint junction units or hubs that provide alternative functions of permitting exclusive data intercommunication between main lines thereof and selected branch lines thereof when certain selection codes are applied to the main lines without the subscriber having knowledge of the selection codes or the network "mapping". The subscriber at the remote location sends a service request defining the function desired and the ultimate downstream terminal to be interconnected or blocked and a control unit in the network consults a network map to identify the upstream and downstream branch lines to be selected, sending a sequence of selection codes to first select the upstream branch and then select the downstream branch or branches. The control unit also monitors responses of the junction units and reports results to the control location.

8 Claims, 20 Drawing Figures

FIG. 5

| LABELS | INSTRUCTION | REMARKS |
|---|---|---|
| NOSRC | CLR TEMP11 | FLAG TO CONCON. DO NOT SEND IDLE AFTER HANGUP |
| | JSR CONCON | CONNECT AND CONVERT DATA PATHS |
| | JMP ENDS2 | WHEN HANGUP OCCURS, ENTER NEXT STATE VIA X STATE |
| ENDS2 | JMP NXSTAT | GO TO NEXT STATE VIA MAIN CONTROL |

FIG. 6

| LABELS | INSTRUCTION | REMARKS |
|---|---|---|
| CONCON | JSR SNDACK | ACKNOWLEDGE PROPER RECEIPT OF ADDRESS |
| | LDX #CHSTA2 | NOW INITIALIZE CHKIN (#BYTES TO CHANGE STATE) |
| | STX TEMP3 | SAVE IN CHKIN COUNTERS |
| | LDA A #%00000011 | MAKE CHKIN ONLY MONITOR ADM IDLE AND NR |
| | STA A TEMP2 | |
| S2S1P1 | LDA B #DME | CONVERT IDLE FROM NET. INTO DME |
| | JSR A OUT | SEND TO ADM |
| S2S1P2 | JSR CHKIN | NOW CHECK AND CONVERT CODES |
| | BEQ ENDES1 | SUFFICIENT IDLE OR NR REC CHANGE STATE |
| | LDA A TEMPO | IF DATA REC FROM ADM SEND IT TO MJU NET |
| | BPL *+5 | IF CONTROL CODE. DON'T PASS TO NET |
| | JSR CONADM | SINCE DATA SEND TO MJU NET |
| | LDA A TEMP1 | WAS BYTE FROM MJU NET CONTROL OR DATA |
| | BPL S2S1P1 | IF IDLE SEND DME |
| | JSR CONNET | IF DATA CONNECT NET TO ADM |
| | BRA S2S1P2 | KEEP CHECKING FOR THESE CODES |
| ENDES1 | LDA A TEMP11 | SINCE ADM IS FINISHED SENDING DATA WAS PATH SELECTED IN NET |
| | BEQ EXES1 | TEMP 11=+1F YES |
| | LDA A #27 | SINCE PATH SELECTED, RELEASE PATH |
| | STA A TEMPO | |
| | LDA B #IDLE1 | SEND IDLE TO ADM. |
| | JSR A OUT | |
| . | JSR N OUT | NOW SEND IDLE INTO NET |
| | DEC TEMPO | |
| | BNE *-6 | |
| | CLR TEMP11 | TELL HANGUP NOT TO SEND CPC |
| | JSR HANGUP | DID ADM REQUEST NEW STATE |
| EXES1 | RTS | RETURN TO CALLING TASK |

FIG. 7

| LABELS | INSTRUCTION | REMARKS |
|---|---|---|
| CHKIN | CLR TEMP 10 | USED IN FINDING IF PREV BYTE WAS NON ACTIVE |
| | LDA B FROMCD | DUMMY READ TO MAKE SURE PIA FLAG = 0 |
| | LDA B FROMCC | CHECK IF INPUT FLAG IS = 1 |
| | BPL * -3 | IF BYTE IS NOT READY TO BE READ THEN KEEP CHECK |
| | LDA A TOCC | SINCE FLAG RAISED ½ BIT EARLY WAIT 4 USEC TO READ DATA (16 BITS). TO CC READ NOW FOR LATER USE |
| | LDX FROMCD | 16 BITS READ 8 FROM CONTROL AND 8 FROM STATION |
| | STX TEMP 0 | MOVE 16 BITS SO THEY MAY BE READ INTO ACCUMULATOR |
| | TST TEMP 10 | TEST PREVIOUS BYTE RECEIVED |
| | BEQ ACTIVE | WAS PREV BYTES ACTIVE CODES |
| | BMI NON ACT | BRA IF PREV NON ACT, BYTE WAS FROM NET |
| | AND B # % 11110111 | DON'T LET NEW BYTE PASS TO MJU NET |
| | STA B FROMCC | SET CA2 LOW. STOPS BYTE FROM PASSING |
| | BRA ACTIVE | NOW CHECK NEW BYTE FOR ACTIVE CODES |
| NON ACT | AND A # % 11110111 | ONLY CHANGE B3 IN C REG TO 0 |
| | STA A TOCC | DON'T LET NEW BYTE PASS TO MJU NET |
| ACTIVE | LDA B TEMP 0 | DATA WORD FROM ADMINISTRATOR TO BE CHECKED |
| | LDA A TEMP 2 | DETERMINES WHAT CODES ARE TO BE CHECKED |
| | AND B # % 11111110 | MASK B0, REMOVES MULT. BIT OR B0 CONT. BIT OR D |
| | CMP B #IDLE1 | CHECK IF BYTE IS IDLE CODE |
| | BNE ADMNR | IF NOT CONTINUE CHECKING |
| | BIT A # % 00000001 | IDLE IS RECEIVED SHOULD IT BE CHECKED? |
| | BEQ NETWRK | IF Z BIT = 0 DON'T CHECK FOR IDLE |
| | DEC TEMP 3 | IF IT IS IDLE DEC TEMP 3 AS INDICATION |
| | BNE CHKIN | IF NOT 0 DON'T RESET BYTE COUNTER (TEMP3) |
| | LDX #ADIDLE | ADDRESS OF NEXT STATE LOADED |
| | STX X STATE | CONTROL IS TO BE PASSED TO THIS NEXT STATE |
| | CLR A | SET Z BIT = 1 |
| | JMP SWBRAK | EXIT SUBROUTINE AT ONE POINT |
| ADMNR | CMP B #NOTRDY | CHECK B FOR NOT READY CODE |
| | BNE ADMDAT | IF CODE IS NOT READY CHECK IF DM FROM ADM |
| | BIT A # % 00000010 | IF NR CODE, SHOULD IT BE COUNTED? |

FIG. 8

| LABELS | INSTRUCTION | REMARKS |
|---|---|---|
|  | BEQ NETWRK | IF Z BIT=0 DON'T COUNT THAT BYTE |
|  | DEC TEMP3 | CHECK IF ENOUGH CODES HAVE BEEN RECEIVED |
|  | BNE CHKIN | IF NOT, DON'T RESET TEMP3 |
|  | LDX #ADNRDY | ADDRESS OF NOT READY STATE |
|  | STX XSTATE | TELLS NXSTAT OF NEW STATE |
|  | CLR A | SET Z=1 FOR TESTING BY CALLING TASK |
|  | JMP SWBRAK | EXIT SUBROUTINE AT LAST INSTRUCTION |
| ADMDAT | BIT B #%10000000 | CHECK IF DATA MODE |
|  | BPL ADMDME | IF NOT DATA THEN CHECK IF DME |
|  | BIT A #%10000000 | Z=1 IF DATA BYTE IS TO BE COUNTED |
|  | BEQ NETWRK | WAS DATA BYTE BUT IGNORE BYTE |
|  | DEC TEMP3 | REDUCE BYTE COUNTER |
|  | BNE CHKIN | IF NOT 0 THAN DON'T RESET COUNTER (TEMP3) |
|  | LDX #ADDATA | LOAD CONTROL DATA STATE ADDRESS |
|  | STX XSTATE | NEXT STATE TO ENTER LOADED INTO POINTER |
|  | CLR A | SET Z=1 FOR CALLING TASK CHECK |
|  | JMP SWBRAK | EXIT SUBROUTINE AT END |
| ADMDME | CMP B #DME | IS CODE DME? |
|  | BNE ADPASS | IF NOT THEN PASS CODE THROUGH |
|  | LDA B #UMC | NOW SEND UMC |
|  | LDA A SUB56 | SET B0 FIRST |
|  | BNE *+4 | 0 = SUBRATE, 1 = 56 |
|  | ORA B #%00000001 | SET B0=1 SINCE 56 KBS |
|  | STA B TOSD | PUT INTO OUTPUT REG |
|  | LDA A #SENDI | SET PIA FOR LOADING |
|  | STA A TOSC |  |
|  | LDA A #CHSTAI | RESET BYTE COUNTERS TO 0 |
|  | STA A TEMP3 |  |
|  | JMP SWOPEN | EXIT FOR FURTHER CHECKING |
| ADPASS | LDA B FROMCC | ONLY CHANGE B3 IN CONTROL REG CHANGE IF B3=0 |
|  | BIT B #%00001000 | CHECK IF MCU IS ALREADY SHIFTING BYTES |
|  | BNE *+9 | BRA IF ALREADY IN SHIFTING MODE (B3=1) |
|  | ORA B #%00001000 | CHANGE CA2=1 TO SHIFT BYTE |
|  | STA B FROMCC | PUT CA2=1 OUT |
|  | STA B TEMP10 | SETS TEMP10 = +, B7 SHOULD=0, NON ACT, BYTE REC |
|  | LDA A #CHSTAI | SINCE BYTE NOT VALID RESET COUNTER |
|  | STA A TEMP3 | RESET TO NEW ORIG VALUE |
|  | JMP CHKIN+3 | SINCE THAT BYTE WAS NOT VALID IS NEXT BYTE GOOD? |

FIG. 9

| LABELS | INSTRUCTION | REMARKS |
|---|---|---|
| NETWRK | LDA B TEMP 1 | CHECK IF WORD FROM NETWORK IS DATA (B7=1) |
| | AND B #%11111110 | REMOVE B0 MULTIPLX BIT |
| | BPL NETIDL | IF NOT DATA RESET COUNTER |
| | BIT A #%01000000 | Z=1 IF DATA WORD IS TO BE COUNTED |
| | BEQ SWOPEN | IF NOT TO BE CHECKED RESET COUNTER |
| | DEC TEMP 4 | COUNT RECEIVED BYTE FOR STATE TRANSITION |
| | BEQ DATST | GET READY TO GO TO THAT STATE |
| | JMP CHKIN | IF NOT 0 YET DON'T DO ANYTHING |
| DATST | LDX #NETDA | LOAD NETWORK DATA STATE ADDRESS |
| | STX XSTATE | ADDRESS OF NEXT STATE LOADED INTO POINTER |
| | CLR A | SET Z=1 FOR CALLING TASK CHECKING |
| | BRA SWBRAK | EXIT SUBROUTINE AT END |
| NETIDL | CMP B #IDLE 1 | IS BYTE FROM MJU NET IDLE? |
| | BNE NETPAS | IF NOT NET IDLE LET LET BYTE PASS |
| | BIT A #%00100000 | SINCE IT IS IDLE SHOULD IT BE CHECKED |
| | BEQ SWOPEN | IF BIT=0 IGNORE NET IDLE |
| | DEC TEMP 4 | SINCE IDLE IS TO BE CHECKED IS ENOUGH REC? |
| | BEQ *+5 | ENOUGH BYTES REC? |
| | JMP CHKIN | IF NOT, DON'T RESET COUNTER |
| | LDX #ADIDLE | IF ENOUGH BYTES REC THEN GO TO THAT STATE NEXT |
| | STX XSTATE | NEXT STATE LOADED INTO POINTER |
| | CLR A | SET Z BIT=0 TO TELL CALLING TASK TO CHANGE ST |
| | BRA SWBRAK | EXIT SUBROUTINE AT ONE POINT (SWBRAK) |
| NETPAS | LDA B TOCC | SET CA2=1 TO LEFT BYTE PASS |
| | BIT B #%00001000 | BUT CHECK IF ALREADY SHIFTING BYTES |
| | BNE *+11 | DON'T BOTHER SETTING CA2=1 IF ALREADY SHIFTING |
| | ORA B #%00001000 | SINCE LOADING AND SHIFTING SET CA2=1 |
| | STA B TOCC | PUT B3=1 OUT |
| | CLR B | SET TEMP 10 NEG SINCE NON-ACTIVE BYTE REC |
| | COM B | FROM MJU NET |
| | STA B TEMP 10 | NON ACTIVE BYTE INDICATOR |
| | LDA A #CHSTA1 | RESET COUNTER SINCE BYTE WAS? CHECK NEXT BYTE |
| | STA A TEMP 4 | |
| | JMP CHKIN +3 | IMMEDIATELY CHECK NEXT BYTE FOR VALIDITY |
| SWOPEN | LDX #CHSTA2 | GET ORIGINAL BYTES FOR TRANSITION |
| | STX TEMP 3 | RESET COUNTERS |
| SWBRAK | RTS | RETURN TO MAIN PROG |

FIG. 10

| LABELS | INSTRUCTION | REMARKS |
|---|---|---|
| CONADM | LDA A TOSD | MAKE SURE FLAG IS 0 BEFORE CHANGING CA2 |
|  | LDA A TOSC | IS IT OK YET? |
|  | BPL *-3 | WAIT UNTIL BYTE HAS BEEN ALIGNED |
|  | LDA A #CLEAR 1 | SETS CA2=1 WHICH SHIFTS BYTES THROUGH MCU |
|  | STA A TOSC | NOW PUT CA2 = 1 |
|  | RTS | NOW RETURN TO CALLING TASK |

FIG. 11

| LABELS | INSTRUCTION | REMARKS |
|---|---|---|
| CONNET | LDA A TOSD | DUMMY READ TO MAKE SURE FLAG IS 0 FOR SYNC |
|  | LDA A TOSC | CHECK FLAG, IS IT OK TO CHANGE CA2 TO A1? |
|  | BPL *-3 | WAIT UNTIL BYTE HAS BEEN REC |
|  | LDA A #CLEAR 1 | TELLS HARDWARE TO SHIFT BYTE THROUGH TO ADM |
|  | STA A TOCC | HARDWARE CONNECTED TO CA2 OF THIS CONTROL REG |
|  | RTS | RETURN TO CALLING TASK |

FIG. 12

| LABELS | INSTRUCTION | REMARKS |
|---|---|---|
| HANGUP | TST TEMP 11 | IS TEMP 11 = + = SEND CPC? |
|  | BEQ *+8 | IF NOT WAIT FOR HANGUP |
|  | JSR SNDNAK | SEND NEG ACK BEFORE CPC |
|  | JSR SCPC | NOW SEND CPC |
|  | LDX #UMCIDL | WAIT FOR HANGUP, SEND UMC INTO NET AND IDLE TO A |
|  | JSR OUTPUT | SEND OUT BYTES SIMULTANEOUSLY |
|  | LDA A #%00000011 | INIT CHKIN |
|  | STA A TEMP 2 | CHECK FOR ADM IDLE AND NR |
|  | LDX #CHSTA 2 | BYTES REQUIRED TO CHANGE STATE |
|  | STX TEMP 3 |  |
|  | JSR CHKIN | NOW WAIT FOR HANGUP |
|  | BNE *-3 |  |
|  | RTS | AFTER ADM HANGS UP CHANGE STATE (RETURN TO MAIN) |

FIG. 13

| LABELS | INSTRUCTION | REMARKS |
|---|---|---|
| SRC0 | LDX TEMP 3 | FREES UP TEMP 3-4 FOR SUBS |
| | STX TEMP 14 | NEW LOC FOR POINTER OF SELECT STRING |
| | LDA B TEMP 5 | FREE UP AND MOVE FOR LOOP COUNTING |
| | BNE S2T5P4-2 | THIS SRC REQUIRES ADDRESSES, ANY GIVEN? |
| | LDA A #5 | IF NONE SEND CPC=55 |
| | TAB | |
| | BRA ERR2T5 | SEND CPC AND IDLE |
| | STA B TEMP 13 | SAFE AREA TEMP 0 TO TEMP 12 USED IN SUBS |
| S2T5P4 | LDX TEMP 14 | GET NEXT ADDRESS TO SELECT |
| | LDA A X | GET FROM NEW STRING |
| | DEX | POINT TO NEXT ADDR FOR NEXT PASS |
| | STX TEMP 14 | |
| | CLR B | SEARCH FOR THE ADDR PART IN ACCA |
| | CLC | CAN BE CHANGED TO CLC (SOC) TO PREVENT |
| * | | CHECK SUMMING IN MAPPER |
| | LDX #MAPTAB | START SEARCH AT BEGINNING OF TABLE |
| | JSR MAPPER | NOW GET BRANCH BYTES FROM MAP |
| | BMI ERR2T5+6 | ERROR FOUND, RETURN IDLE |
| | BNE MTCH | TEST IF MATCH FOUND IN MAP |
| S2T5P6 | LDA A #6 | NO MATCH FOUND OR >2 DIGITS ISSUE CPC=62 |
| | LDA B #2 | |
| | BRA ERR2T5 | SEND CPC=62 |
| MTCH | JSR SELECT | SELECT PORT NOW<br>ACCB=#PORTS TO SELECT |
| | BMI ERR2T5+6 | IF ERROR ACCB=NEG |
| | DEC TEMP 13 | IS THIS THE LAST PORT TO SELECT? |
| | BEQ S2T5P5 | IF YES CONNECT ADM TO NET |
| | LDA A #27 | IF NO SEND 27 FRAMES OF IDLE TO RELEASE PORT |
| | STA A TEMP0 | PORT WAS PROBABLY PREVIOUSLY BLOCKED |
| | LDA B #IDLE 1 | |
| | JSR NOUT | SEND IDLE OUT INTO NET |
| | DEC TEMP0 | HAVE 27 FRAMES BEEN SENT? |
| | BNE *-8 | IF NOT KEEP SENDING |
| | BRA S2T5P4 | IDLES SENT, SELECT NEXT PORT |
| S2T5P5 | LDA A #$0F | POS NO TELLS CONCON TO SEND 27 FRAMES |
| | STA A TEMP11 | OF IDLE BEFORE EXITING, THIS DROPS SELECTED |
| | JSR CONCON | PATH THAT WAS FIRST SELECTED |
| | BRA *+7 | BYPASS HANGUP SINCE ALREADY HUNGUP |
| ERR2T5 | STA A TEMP11 | SINCE A HAS A CPC IN IT, USE IT TO MAKE TEMP 11 |
| | JSR HANGUP | POSITIVE TELLS SUB TO SEND OUT CPC AND THEN I |
| | JMP ENDS2 | EXEC EXISTS, TASK 5 HERE CHANGE STATE |

FIG. 14

| LABELS | INSTRUCTION | | REMARKS |
|---|---|---|---|
| SELECT | PSH A | | SAVE ADDR FOR CALLING TASK OR ALRLED SUB |
| | LDA A | #3 | THREE ATTEMPTS WILL BE MADE TO SELECT THE PORT |
| | STA A | TEMP8 | SET INTO ATTEMPT COUNTER |
| | DEC B | | ADJUST COUNTER FOR THIS SUB |
| | STA B | TEMP7 | SAVE NO OF PORTS TO SEL FOR THIRD PASS |
| | LDX | #$1F | PORTS ARE FOUND FROM 1F-10 |
| | STX | TEMP9 | SAVE PORT STACK ADDR FOR 2 $ 3RD ATTEMPT |
| SELP3 | LDA B | TEMP7 | USED TO CHECK IF TOTAL NO OF BRANCHES REC |
| | INC B | | ADJUST COUNTER |
| | STA B | TEMP12 | LOOP COUNTER FOR PASSES |
| | LDX | #RTDELA | INIT DELAY COUNTERS |
| | STX | TEMP4 | INIT ON SECOND PASS AS WELL |
| | LDX | TEMP9 | WHAT IS NEXT PORT TO SEND? |
| | STX | TEMP0 | POINTS TO NEXT BRANCH TO SEND |
| | STX | TEMP2 | POINTS TO NEXT BRANCH TO BE REC FROM NET |
| | LDA B | #$FF | INIT BRANCH RETURNED COUNTER TO -1 |
| | STA B | TEMP6 | RETURNED BRANCH COUNTER |
| | CLR | TEMP11 | TA COUNTER INIT |
| SELL1 | DEC | TEMP12 | IS THIS THE LAST PORT TO BE SELECTED? |
| | BPL | SELP10 | IF LAST PORT SELECTED WAIT FOR BRANCH |
| | JMP | SELP1 | |
| SELP10 | LDA B | #TA | NOT LAST PORT KEEP SELECTING |
| | JSR | NINOUT | SEND OUT ACCB-BYTE READ IS IN ACCA |
| | CMP A | #TA | DON'T COUNT OR EVEN CHECK BYTE IF TA HASN'T |
| | BNE | SELP11 | BEEN RECEIVED YET IS BYTE=TA? |
| | INC | TEMP11 | TA BYTE JUST REC CHECK FOR BRANCH CODE |
| | BRA | SELP4 | SEND OUT MA BYTE |
| SELP11 | CMP A X | | WAS THE NEXT BRANCH CODE RETURNED? |
| | BNE | SELP4 | IF NOT, SEND MA |
| | TST | TEMP11 | SINCE TA WAS REC AND CORRECT BRANCH RETURNED |
| | BEQ | SELP4 | CLEAR TA COUNTER AND POINT TO NEXT BRANCH |
| | CLR | TEMP11 | RESET TA COUNTER FOR NEXT BRANCH CHECK |
| | DEX | | NEXT BRANCH CODE REC POINT TO NEXT BRANCH |
| | INC | TEMP6 | COUNT ALL RETURNED BRANCHES |
| SELP4 | LDA B | #MA | KEEP SENDING SELECT SEQUENCE |
| | JSR | NINOUT | READ BYTE FROM NETWORK AND SEND MA INTO NETWORK |
| | CMP A | #TA | HAS TA BEEN REC, FIRST? |
| | BNE | SELP12 | DON'T BOTHER CHECKING FOR BRANCH IF NOT |
| | INC | TEMP11 | TA JUST RECEIVED-COUNT IT |

FIG. 15

| LABELS | INSTRUCTION | REMARKS |
|---|---|---|
| SELP 4 | BRA SELP 5 | SINCE TA REC START CHECKING FOR CORRECT BR |
| SELP 12 | CMP A X | WAS NEXT BRANCH RECEIVED YET? |
|  | BNE SELP 5 | IF NOT, SEND OUT BRANCH CODE FOR NEXT PORT |
|  | TST TEMP 11 | HAS A TA BYTE BEEN REC? |
|  | BEQ SELP 5 | DON'T COUNT BR BYTE UNTIL IT IS |
|  | CLR TEMP 11 | YES, TA REC AND BR MATCH CLR FOR NEXT TA |
|  | DEX | POINT TO NEXT BRANCH TO BE RETURNED |
|  | INC TEMP 6 | COUNT ALL PROPER BRANCHES RETURNED |
| SELP 5 | STX TEMP 2 | REMEMBER NEXT BRANCH TO BE RECEIVED |
|  | LDX TEMP 0 | GET NEXT BRANCH CODE TO SEND OUT |
|  | LDA B X | GET FROM PORT STACK |
|  | DEX | POINT TO NEXT BRANCH CODE TO BE SENT |
|  | JSR NINOUT | GET NEXT BYTE FROM NET SEND OUT BRANCH CODE |
|  | STX TEMP 0 | LET X POINT TO NEXT BRANCH CODE TO BE RECEIVED |
|  | LDX TEMP 2 | POINTER SAVED HERE |
|  | CMP A #TA | DON'T CHECK BYTE UNLESS TA FIRST REC |
|  | BNE SELP 13 | CHECK NEXT BYTE IF NOT |
|  | INC TEMP 11 | YES, BYTE IS TA COUNT IT |
|  | BRA SELP 6 | CHECK NEXT BYTE AND SEND NEXT BYTE |
| SELP 13 | CMP A X | WAS BRANCH BYTE JUST READ? |
|  | BNE SELP 6 | IF NOT DON'T COUNT BYTE |
|  | TST TEMP 11 | BEFORE COUNTING BR BYTE HAS TA BEEN REC? |
|  | BEQ SELP 6 | BRANCH IF NOT |
|  | CLR TEMP 11 | TA HAS BEEN REC COUNT BRANCH AND RESET TA COUNTER |
|  | DEX | NEXT BRANCH WAS RECEIVED POINT TO NEXT BRANCH |
|  | INC TEMP 6 | COUNT ALL BRANCH BYTES RETURNED |
| SELP 6 | LDA B #UMC | STILL SEND OUT UMC BYTE TO END SELECT SEQUENCE |
|  | JSR NINOUT | AT SAME TIME READ BYTE FROM NET AND SEND UMC |
|  | CMP A #TA | HAS A TA BYTE BEEN REC? |
|  | BNE SELP 14 | DON'T CHECK ANYTHING IF NOT |
|  | INC TEMP 11 | TA JUST REC CHECK FOR BRANCH CODE NOW |
|  | BRA SELP 7 | SEND NEXT SELECT CODE |
| SELP 14 | CMP A X | HAS THE NEXT BRANCH BEEN RECEIVED YET? |
|  | BNE SELP 7 | IF NOT, SEND NEXT SELECT SEQUENCE |
|  | TST TEMP 11 | DON'T COUNT BR BYTE IF TA NOT REC |
|  | BEQ SELP 7 | DON'T COUNT BR IF NOT TA |
|  | CLR TEMP 11 | COUNT BYTE AND RESET TA COUNTER |
|  | DEX | POINT TO NEXT BRANCH TO BE RECEIVED NEXT |

FIG. 16

| LABELS | INSTRUCTION | REMARKS |
|---|---|---|
| SELP14 | INC TEMP6 | COUNT ALL BYTES OF BRANCH CODE REC |
| SELP7 | JMP SELL1 | SEND NEXT SELECT SEQUENCE |
| SELP1 | LDA A TEMP7 | HAVE ALL BRANCHES BEEN REC? |
|  | SUB A TEMP6 | USE BRANCH REC COUNTER |
|  | BEQ SELP15 | DON'T WAIT IF ALL BRANCHES REC |
|  | LDA A TEMP11 | LOAD TA COUNTER INTO ACCA FOR FAST ACCESS |
| SELP16 | JSR NINPUT | THIS JSR BEGINS A TIME CRITICAL LOOP (107 μ SEC) IS NEXT BYTE FROM NETWORK THE RIGHT BRANCH? |
|  | CMP B #TA | DON'T CHECK FOR BR IF TA NOT REC |
|  | BNE *+5 | IF NOT TA SEND NEXT CODE |
|  | INC A | TA REC NOW CHECK FOR BR CODE |
|  | BRA SELP2 | KEEP COUNTING BYTES FOR DELAY |
|  | CMP B X | CHECK BRANCH TABLE |
|  | BNE SELP2 | IF NOT BRANCH, START DELAY |
|  | TST A | WAS TA REC? |
|  | BEQ SELP2 | IF TA NOT REC COUNT AS A DELAY BYTE |
|  | CLR A | TA AND BR REC RESET FOR NEXT BR CODE |
|  | DEX | IF BRANCH REC POINT TO NEXT BRANCH |
|  | INC TEMP6 | IF CORRECT BRANCH COUNT IT |
|  | LDA B TEMP7 | HAVE ALL BRANCH BYTES BEEN REC YET? |
|  | SUB B TEMP6 | CHECK IF ALL SENT |
|  | BEQ SELP15 | IF ALL BRANCHES REC SET RETURN CODE=0 |
| SELP2 | STX TEMP2 | SAVE POINTER TO COUNT BYTE IN X |
|  | LDX TEMP4 | DELAY COUNTER |
|  | DEX | COUNT BYTE IF NOT CORRECT BRANCH |
|  | BNE SELP8 | IF NOT 0 YET KEEP COUNTING BYTES |
|  | LDA B #27 | SINCE PASS FAILED RELEASE ALL SELECTED PORTS |
|  | STA B TEMP11 | THIS WAY ALL BRANCHES ARE RETURNED |
|  | LDA B #IDLE1 | RELEASE ALL PORTS BY SENDING IDLE |
|  | JSR NOUT | SEND 27 FRAMES OF IDLE |
|  | DEC TEMP11 |  |
|  | BNE *-6 | SEND ALL FRAMES |
|  | DEC TEMP8 | HAS 3 ATTEMPTS BEEN MADE? |
|  | BEQ SELP9 | ISSUE ERROR MESG IF SO |
|  | JMP SELP3 |  |
| SELP9 | LDA A TEMP6 | SINCE 3RD TRY NOW RETURN PORT SEQ NO NOT REC |
|  | INC A | ADD 1 SINCE THAT BYTE NOT RETURNED |
|  | ORA A #%00010000 | RETURN TYPE ERROR = 1 AND PORT NOT RET BRANCH |
|  | PUL B | ALSO GIVE ALRLED ADDR TO BE SELECTED |

FIG. 17

| LABELS | INSTRUCTION | REMARKS |
|---|---|---|
| SELP9 | JSR ALRLED | ISSUE ALARMS TO TELCO |
|  | LDA A #6 | ISSUE CPC=61 TO ADM |
|  | LDA B #1 |  |
|  | JSR SNDNAK |  |
|  | JSR SCPC |  |
|  | LDA A #27 | RELEASE ALL SELECTED PORTS SINCE ERROR |
|  | STA A TEMP0 | SEND 27 FRAMES OF IDLE INTO THE MJU NET |
|  | LDA B #IDLE1 |  |
|  | JSR NOUT | SEND IDLE TO MJUS |
|  | DEC TEMP0 | 27 FRAMES BEEN SENT YET? |
|  | BNE * - 6 | GO BACK IF NOT |
|  | LDA B #IDLE1 | NOW SEND IDLE TO ADM |
|  | JSR AOUT |  |
|  | LDA B #UMC | HOLD NET UNTIL ADM FREES IT UP |
|  | JSR NOUT |  |
|  | LDA B #% 11111111 | RETURN ERROR CODE |
|  | BRA SELEND |  |
| SELP8 | STX TEMP4 | KEEP DELAYING FOR BRANCHES |
|  | LDX TEMP2 | POINT TO NEXT BRANCH TO BE RETURNED |
|  | BRA SELP16 | KEEP READING BYTES AND LOOKING FOR NEXT BRANCH THIS BRA ENDS THE TIME CRITICAL LOOP |
| SELP15 | PUL A | RETURN ADDR SP=RETURN ADDR |
|  | CLR B | ALL PORTS REC, RETURN A CODE OF 0 |
| SELEND | RTS | RETURN TO CALLING TASK |

FIG. 18 DATA EXCHANGE CCT 205

SIGNALING UNIT FOR INTERCHANGE OF DATA WITH MULTIPOINT LINE SELECTION UNITS AND DATA TERMINALS

TECHNICAL FIELD

This invention relates to data communication networks and, more particularly, to the configuration of a communication network by the selection of branch lines of network hubs or junction units.

BACKGROUND OF THE INVENTION

A private line data network shared in parallel by a plurality of terminal stations whose operations are controlled from a remote control station is known as a multipoint or party line. The control station is equipped with a master controller, such as a computer, which can communicate with any of the terminal stations, instructing the terminal stations to transmit messages to the computer station which stores and possibly processes the messages thus received from the sending terminals and then possibly retransmits the messages to other terminals on the multipoint network or on other multipoint networks that may be connected to the computer.

The computer station is connected to a common carrier central office called a hub office containing a unit called a multipoint junction unit. This unit accepts the downstream signals from the control station on a main line thereof and splits the signals for application to branch lines to further convey or broadcast the signals in the downstream direction towards terminal stations, to other local offices or to other hub offices further downstream. In the latter case, the signals applied to the main line of the downstream junction unit are split again to be broadcast to branch lines radiating from the downstream hub to the terminals connected thereto. In the upstream direction, transmission from a downstream terminal passes to the branch line in the downstream hub office where the signal is combined by the multipoint junction unit with signals on other branch lines and the resultant signals are applied to the main line of the downstream unit. These signals are propagated up to a branch in the upstream hub office, combined with signals on other branches and transmitted upstream to the computer station subject to the condition that only one station at a time can send to the computer station.

It is a known function of the common carrier to provide appropriate administrative or housekeeping chores for the network, which function includes selecting one or more branch lines, to the exclusion of others, to constitute the data network or, alternatively, removing or blocking one or more branch lines to take those blocked branches out of the network. In U.S. Pat. No. 4,122,301, which issued to L. M. Kolensky, W. R. Schaefer, G. G. Schlanger and A. H. Willand, there is disclosed a multipoint network provided with multipoint junction units that permit exclusive data intercommunication with or block data intercommunication with selected branches when certain selection (or blocking) codes are applied to main lines thereof. Accordingly, to appropriately configure the network, an attendant at the upstream hub office first ascertains which branches are to be selected to either provide exclusive data interchange or to be blocked. The attendant then operates hub office control equipment to send appropriate selection codes to the main line of the upstream junction unit if an upstream branch is to be selected. When a downstream branch is to be selected, the attendant first sends the selection code which selects the upstream branch (connected to the downstream unit) for exclusive data interchange and then sends the selection code which selects the appropriate downstream branch (for exclusive data interchange or blockage). Each junction unit is arranged to report back its selection operations so that the attendant can observe the configuring of the network.

It is sometimes desirable, for private line data networks, to be able to configure the network from the remote control location. This location, however, may be under control of a carrier subscriber rather than the common carrier and this subscriber may not know which downstream branches are connected to the network terminals, which upstream branches are connected to the downstream units and which selection codes will select these various branches. It is therefore a broad object of this invention to configure the network from a remote location without knowledge of the selection codes or the network "mapping."

SUMMARY OF THE INVENTION

In accordance with the objects of this invention, there is provided a multipoint control unit which, when the remote location sends a service request including an address signal defining a data terminal, identifies the upstream branch line connected to the main line of the downstream unit and identifies the downstream unit branch line connected to the defined data terminal and sends a sequence of selection signals to the upstream unit main line to select the identified upstream branch line and to thereafter select the identified downstream branch line.

It is a feature of this invention that the control unit interconnects the remote location and the upstream unit main line upon completion of the sequential selections. More specifically, the control unit monitors the reports of the several upstream and downstream units, sends signals to the remote location defining selection failure or success, interconnecting the remote location and upstream unit main line when there is a sequence of successful selections and sending terminating signals to the main line to terminate branch selections when there is a selection failure.

In accordance with a specific embodiment of this invention, the control unit stores mapping information for each data terminal identifying the upstream unit branch line connected to the downstream unit main line and identifying the downstream unit branch line connected to the terminal. The control unit also stores instructions for obtaining and processing the mapping information and includes a processor which, in response to the reception of an address signal from the control location, processes the mapping information for the data terminal defined by the address signal and generates the selection codes for the identified branches.

The foregoing and other objects and features of this invention will be more fully understood from the following description of an illustrative embodiment taken in conjunction with the accompanying drawings.

BRIEF DESCRIPTION OF THE DRAWING

In the drawings:

FIGS. 5 through 17 depict instructions and accompanying remarks for various routines of the processes followed by the control unit processor.

FIG. 18 shows, in schematic form, the details of the circuitry of a data exchange circuit used in the multipoint control unit;

DETAILED DESCRIPTION

Figure 1:
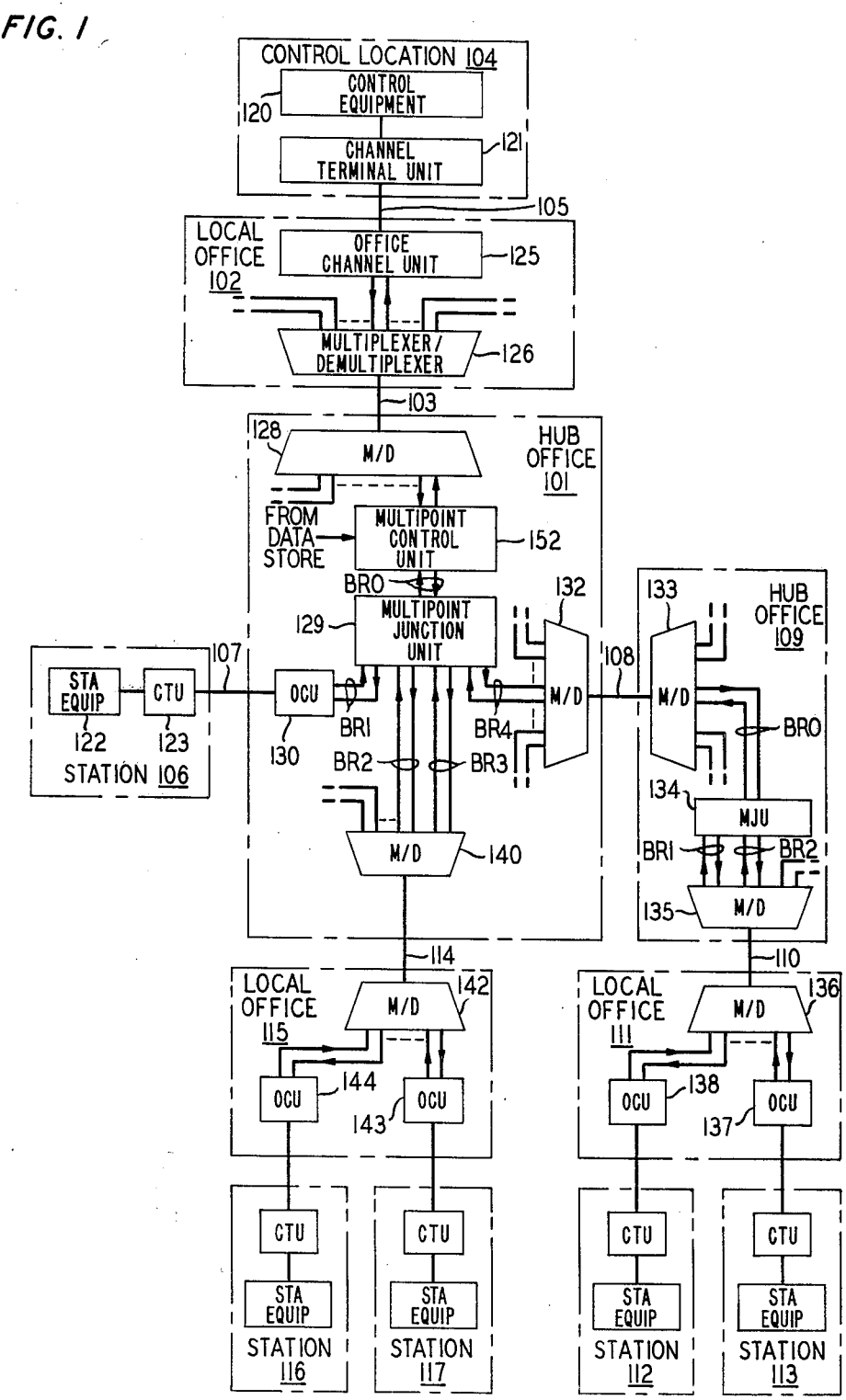
FIG. 1 discloses, in block form, various circuits and equipment which form a multipoint network.

The selective calling system as shown in FIG. 1 comprises control location 104, stations 106, 112, 113, 116 and 117 and an interconnecting network that interconnects control location 104 with the various stations. This interconnecting network includes hub offices 101 and 109 and local offices 102, 111 and 115. Control location 104 is connected to local office 102 over two-way line loop 105, which line loop is arranged to accommodate line signaling in both directions. Similarly, each of the stations is connected to a hub or local office by way of a line loop which accommodates similar duplex line signaling. The offices are interconnected by way of two-way transmission trunks, local office 102 being connected to hub office 101 by way of two-way transmission trunk 103. Hub office 101 is, in turn, interconnected to hub office 109 and local office 115 by way of two-way trunks 108 and 114, respectively. Similarly, hub office 109 is interconnected with local office 111 by way of two-way trunk 110.

In general, in accordance with this invention, equipment in hub office 101 is controlled by control location 104 to arrange the interconnecting network into various configurations. In one of these configurations, which may be characterized as a broadcast configuration, data originating from control location 104 is split in the hub offices and simultaneously broadcast downstream through all of the trunks annd line loops to all of the stations and, in the reverse direction, data originating from the several stations is combined in the hub offices and conveyed to control location 104, subject to the condition that a station cannot communicate with another station and two stations cannot transmit to control location 104 at the same time. In accordance with another configuration arranged by equipment in hub office 101, data signaling may be provided between control location 104 and selected ones of the stations to the exclusion of unselected ones of the stations. In addition, the network may also be configured to block data signaling between the control location and selected ones of the stations and, under this condition, the data originating from control location 104 is simultaneously broadcast to the "unblocked" ones of the stations to the exclusion of the "blocked" ones of the stations and, in the reverse direction, data can be received from the "unblocked" stations.

Control location 104 generally consists of control equipment indicated by block 120 and channel terminal unit 121. Control equipment 120 includes a data message transmitter (not shown) for sending data word or character messages to the stations, a data message recorder (not shown) for receiving data word or character messages from the stations and control circuit equipment including automatic and keyboard controlled generators (not shown) for sending service request sequences to hub office 101 to configure the network and for generating and sending address or selection words or characters to start station transmitters and turn on station recorders. The control equipment may also include recording and display circuits for receiving, recording and displaying responses which may be received from the network or from the stations connected to the network. The data signals thus generated and sent by control equipment 120 are passed to channel terminal unit 121 which converts the words to line signals suitable for application to two-way loop 105. Channel terminal unit 121 also converts the incoming line signals on two-way loop 105 to data and selection words or characters for application to control equipment 120.

Each station consists of station equipment and a channel terminal unit, such as station equipment generally indicated by block 122 and channel terminal unit 123 in station 106. A station transmitter for sending data word messages to the control location and a station recorder for receiving data word messages from the control location are included in the station equipment of each station. In addition, the station equipment includes circuit equipment for recognizing address words from the control location to start the station transmitter or turn on the station recorder. Thd channel terminal unit in the station is arranged in substantially the same manner as channel terminal unit 121, converting locally generated data words to appropriate lines signals for application to the station loop, such as loop 107, and for converting incoming line signals to corresponding data and address words.

Suitable control equipment for control location 104 and station equipment for each station, such as station 106, is disclosed in U.S. Pat. No. 3,427,588, issued to P. T. Mauzey, C. J. Votaw and H. M. Zydney on Feb. 11, 1969.

It is contemplated that the network constitutes part of a digital data system and the local and hub offices in the network are arranged to multiplex data on various incoming channels for application to outgoing trunks and to demultiplex data on incoming trunks for application to outgoing channels or for remultiplexing and application to outgoing trunks.

The first local office downstream from control location 104 is local office 102. Local office 102 includes office channel unit 125 and multiplexer/demultiplexer 126. Office channel unit 125 receives the data transmission from control location 104 and assembles or imbeds the bits of the data character stream into eight-bit bytes, writing an appropriate bit (such as a "1" bit) into the eighth bit position of the byte to denote that the byte comprises a data word (as opposed to a supervisory control byte which contains a "0" bit in the eighth bit position). The byte is then fed into one port of multiplexer/demultiplexer 126 to be inserted into one time slot on trunk 103, while bytes from other office channel units (not shown) in local office 102 are applied to other input ports of multiplexer/demultiplexer 126 for insertion into other time slots on trunk 103. The multiplexed bytes are then transmitted downstream via trunk 103 to hub office 101.

The multiplexed bytes coming upstream from hub office 101 on trunk 103 are passed to multiplexer/demultiplexer 126, which distributes the bytes in each time slot to individual output ports, such as the port connected to the path extending to office channel unit 125. Office channel unit 125, in turn, strips off the eighth bit of the byte, disassembles the byte and applies the corresponding line signals to loop 105 for transmission upstream to control location 104.

Although the specific circuitry for multiplexer/demultiplexer 126 and office channel unit 125 for providing the above-described functions may comprise many different well-known arrangements, it is preferred that the circuitry be of the type disclosed in U.S. Pat. No. Re 29,215 issued May 10, 1977 to A. C. Carney, M. P. Cichetti, Jr., J. G. Kneuer and D. W. Rice.

The downstream data on trunk 103 from local office 102 is passed to multiplexer/demultiplexer 128, which is arranged in substantially the same manner as multiplexer/demultiplexer 126, and which distributes the data to its various output ports, applying to each port the data byte in the time slot corresponding to the port. The data bytes from office channel unit 125 are therefore provided to one port of multiplexer/demultiplexer 128, which port is connected to multipoint control unit 152.

Multipoint control unit 152 has the capability of accepting service request sequence commands from the control location and generating appropriate "housekeeping" bytes to automatically configure the network in accordance with the command from the control location (control and data bytes being used for control and housekeeping functions). In addition, multipoint control unit 152 monitors byte responses from the downstream portions of the network and reports these responses to control location 104 for display thereat. Thereafter, when the network is configured, multipoint control unit 152 becomes transparent to upstream and downstream data, permitting control location 104 to send appropriate data character selection signals to "unblocked" stations to start station transmitters and/or turn on station recorders and to thereby communicate with such stations.

In accordance with this embodiment, multipoint control unit 152 is capable of accepting service requests from control location 104. A service request may comprise a broadcast request consisting of a single digit (character) or a service request sequence consisting of a station address or a plurality of station addresses followed by a particular service request. Each service request in the service request sequence from control location 104 may also constitute a predefined digit; examples of such service requests comprising:
1. Select one or more branches (to designated stations or groups of stations);
2. Block one or more branches (to designated stations or groups of stations);
3. Unblock one or more branches (to designated stations or groups of stations).

Multipoint control unit 152, in response to a broadcast request or a service request sequence, sends appropriate commands downstream (in the form of housekeeping bytes). In response to the service request sequence, multipoint control unit 152 issues a plurality of separate commands, in sequence, to select, block and/or unblock "branches" to designated (addressee) stations or group of stations and monitors the response to each command and to report the change in the network configuration to the control location. The above-described "housekeeping" bytes to configure the network and data passed through multipoint control unit 152 are passed downstream to main linee BR0 of multipoint junction unit 129.

In the "broadcast" mode, the multipoint junction unit is arranged to accept data bytes coming down on main line BR0 and to simultaneously apply the data bytes to downstream paths of various branch lines, multipoint junction unit 129 having four branch lines designated branches BR1, BR2, BR3 and BR4. The multipoint junction unit is also transparent in the broadcast mode to data bytes coming upstream on these four branches. In addition, a control byte traveling upstream is converted by the multipoint junction unit to an "idle" data byte to eliminate interference with a signaling branch.

When multipoint control unit 152 starts to send the several commands downstream for a service request sequence, the multipoint junction unit initially blocks all of the downstream branches. If commands to select one or more branches is then received from multipoint control unit 152, the multipoint junction unit unblocks the branch or branches thus selected, rendering the selected branch or branches transparent to all data upstream and downstream, while transmission to and from unselected branches is blocked. Alternatively, appropriate commands from multipoint control unit 152 may selectively block one or more branches whereby signals may proceed through all the unselected branches and be precluded through the blocked branch or branches. A multipoint junction unit arranged in this manner is disclosed in U.S. Pat. No. 4,122,301 issued to L. M. Kolensky, Walter R. Schaefer, Gabriel G. Schlanger and Allan H. Willand on Oct. 24, 1978.

The downstream data bytes on the downstream paths of BR1, BR2, BR3 and BR4 of multipoint junction unit 129 are applied to office channel unit 130, an input port of multiplexer/demultiplexer 132 and two input ports of multiplexer/demultiplexer 140. The downstream data bytes on branch BR1 are converted to appropriate line signals by office channel unit 130 and passed by way of loop 107 to station 106. Data bytes on the downstream paths of branches BR2 and BR3 are multiplexed by multiplexer/demultiplexer 140, data bytes on branch BR2 being applied to one time slot and data bytes on branch BR3 being applied to another time slot on two-way trunk 114 for passage downstream to local office 115. Data bytes on the downstream path of branch BR4 are inserted in a time slot of two-way trunk 108 by multiplexer/demultiplexer 132 for passage downstream to hub office 109.

With respect to transmission in the other or upstream direction, line signals from station 106, for example, are passed via line 107 to hub office 101 where they are converted to data bytes by office channel unit 130 and passed to the upstream path of branch BR1. Data bytes coming upstream in two of the time slots on trunk 114 are distributed to two ports of multiplexer/demultiplexer 140 connected to the upstream paths of branches BR2 and BR3. Data bytes coming upstream in one of the time slots on trunk 108 are applied to an output port of multiplexer/demultiplexer 132 connected to the upstream path of branch BR4. The data on these upstream paths of the several branches are combined by multipoint junction unit 129 and applied via the upstream path of main line BR0 to multipoint control unit 152.

The downstream data on two-way trunk 108 from branch BR4 is passed to multiplexer/demultiplexer 133 in hub office 109. Multiplexer/demultiplexer 133 distributes the data to its various output ports and, specifically, applies the data on the downstream path of branch BR4 of junction unit 129 to the main line of multipoint junction unit 134. Multipoint junction unit 134, in turn, splits the data into downstream paths of two branches, branches BR1 and BR2, the two paths extending to input ports of multiplexer/demultiplexer 135. Multiplexer/demultiplexer 135 inserts the data into two time slots on two-way trunk 110. This data is then passed downstream to local office 111 and, more specifically, to multiplexer/demultiplexer 136. Since the data is in two separate time slots, multiplexer/demultiplexer 136 applies the data to two separate output ports, which ports extend to office channel units 138 and 137. Each office channel unit, in turn, converts the data bytes to appropriate line signals for transmission to stations 112 and 113, respectively.

Line signals traveling upstream from station 112 or 113 are transmitted to the connected one of office channel units 138 and 137, respectively. The line signals are thereby converted back to data bit characters, imbedded into data bytes and applied to the connected one of the input ports of multiplexer/demultiplexer 136. Multiplexer/demultiplexer 136 inserts the data bytes from the office channel units into the appropriate time slots on two-way trunk 110. The bytes pass upstream on trunk 110 to multiplexer/demultiplexer 135, which distributes the data bytes in each time slot to a corresponding one of its output ports. The output ports are connected to upstream paths of the two branches (BR1 and BR2) of multipoint junction unit 134 and multipoint junction unit 134, in turn, combines the data on the two upstream branches and applies this data to an input port of multiplexer/demultiplexer 133. The upstream data bytes are therefore inserted in a time slot on two-way trunk 108 and passed upstream to multiplexer/demultiplexer 132, which distributes the data bytes to an output port which is connected to the upstream path in branch BR4 of multipoint junction unit 129. Multipoint junction unit 129 combines the data bytes in the upstream paths of the several branches, as previously described, and sends the data via multipoint control unit 152 to the control location.

The multiplexed downstream data from branches BR2 and BR3 of multipoint junction unit 129, which is inserted into two time slots on two-way trunk 114, is passed to multiplexer/demultiplexer 142 in local office 115. Multiplexer/demultiplexer 142 applies the data bytes in the two separate time slots on trunk 114 to two separate output ports, which ports extend to office channel units 114 and 143, respectively. Each channeel unit, in turn, converts the data bytes to appropriate line signals for transmission to stations 116 and 117, respectively.

Line signals traveling upstream from station 116 or station 117 are transmitted to the connected one of office channel units 144 and 143, respectively. The line signals are converted to data bits, assembled into data bytes and applied to input ports of multiplexer/demultiplexer 142. The multiplexer/demultiplexer inserts the data bytes into appropriate time slots on two-way trunk 114. The bytes pass upstream on trunk 114 to multiplexer/demultiplexer 140, which distributes the data bytes in each time slot to a corresponding one of its output ports. These outputs ports, as previously described, are connected to upstream paths of branches BR2 and BR3. The data bytes are thus combined by multipoint junction unit 129 and sent on to the control location.

In accordance with a preferred arrangement, multipoint control unit 152, each of the multipoint junction units, such as multipoint junction unit 129, and remote components in the network have the capability of intercommunicating with at least ten different bytes which are referred to as housekeeping bytes. These housekeeping bytes are summarized as follows:

| Byte Identification | Function |
| --- | --- |
| Test Alert (TA) | Control byte which initiates any selection sequence. |
| MJU Alert (MA) | Advises multipoint junction unit that signaling is to proceed by way of the unit. |
| Branch 1 (BR1) | Branch BR1 selection code. |
| Branch 2 (BR2) | Branch BR2 selection code. |
| Branch 3 (BR3) | Branch BR3 selection code. |
| Branch 4 (BR4) | Branch BR4 selection code. |
| UMC | Control byte that indicates completion of selection sequence. |
| Idle | Downstream control byte which indicates end of selection commands. Upstream control byte for idle branch. |
| HUB Identification (HID) | Identification of the hub; normally transmitted by hub multipoint junction unit. |
| Block (BL) | Control byte which instructs multipoint junction unit to block the selected branch. |

Assume now that the network is in the "idle" condition. Under this condition, control equipment 120 is "on-hook" and channel terminal unit 121 is sending "idle" signals downsteam and, at the same time, each of the stations is on-hook and sending idle signals upstream. The idle signals from control location 104 travel downstream to office channel unit 125 which converts them to idle bytes which pass on to multipoint control unit 152. Multipoint control unit 152, in this idle mode, monitors the idle bytes and in response applies idle bytes to main branch BR0 of multipoint junction unit 129. The multipoint junction unit, in turn, passes idle bytes to its branches BR1 through BR4 and all stations thus receive idle signals. The upstream idle signals from the various stations are converted to idle bytes by the associated office channel units, combined by the multipoint junction units and idle bytes thus appear on main branch BR0 of multipoint junction unit 129. Multipoint control unit 152 monitors these idle bytes and, in response thereto, sends idle bytes upstream toward control location 104.

Assume now that the control location 104 desires to broadcast a message to all of the stations. To place the network in the appropriate condition, control equipment 120 goes off-hook and initially sends a train of synchronizing characters which are imbedded in the downstream bytes by office channel unit 125. These bytes are passed downstream through local office 102 to multipoint control unit 152. When multipoint control unit 152 recognizes the transition from the idle bytes to data bytes, it passes "restraint" bytes downstream to inform the stations that the control location is making a request to use the network. The several stations will therefore presumably not attempt to initiate transmission. Multipoint control unit 152 also sends back upstream a "dial tone" byte to advise control location 104 that it is prepared to recognize a service request. At the same time, multipoint control unit 152 is aligning its equipment with the downstream sync characters imbedded in the bytes, which alignment amy be provided in any conventional manner. Advantageously, the alignment may be implemented in the manner described in the copending application of R. R. Seibel, Ser. No. 87,246, filed Oct. 22, 1979.

At the control location, when the "dial tone" is received, the service request for a message broadcast is returned, which request constitutes the transmission of the "ETB" (#) ASCII character. Multipoint control unit 152, now aligned with the sync characters, recognizes the "ETB" character as a request to broadcast a message and thereupon renders itself transparent to upstream and downstream data, returning an acknowledgement character to control location 104, advising the control location that the network is configured to broadcast the message to all the stations. Control location 104 can now send appropriate selection character codes to turn on station recorders, start up station transmitters and otherwise communicate with all of the stations on the network.

Control location 104 can terminate the broadcast mode of the network by going "on-hook," again sending idle signals which are converted to idle bytes by office channel unit 125. Multipoint control unit 152, upon recognition of the idle bytes, resumes the monitoring of the upstream and downstream data and so long as the network is idle, continuing to send idle bytes both upstream and downstream, thus restoring the network to the idle mode.

Assume now that, with the network in the idle mode, a line station, such as station 117, for example, desires to send a message to the control location. Initially, the station equipment at station 117 goes off-hook and sends data characters, which advantageously may be sync characters, upstream. These characters are recognized by multipoint control unit 152 and, in response thereto, the control unit passes "ringing" signals upstream to control location 104. Control location 104 responds with "answer" characters. These characters are recognized by multipoint control unit 152 which thereupon renders itself transparent to upstream and downstream data. Control location 104 is thereby enabled to communicate with station 117. The communication between the control location and the station is conventionally terminated by control location 104 by going "on-hook" with the transmission of the idle signal. Multipoint control unit 152, upon the recognition of the idle bytes, restores the network to the idle mode in the same manner as previously described.

If control location 104 desires to select a network branch (which may extend to a remote station or alternatively may extend by way of a downstream multipoint junction unit to a group of stations), the sync characters are transmitted to the network (in the same manner as described for the initiation of the broadcast mode) followed by the transmission of the service request sequence that identifies the station or group address and the service request code. For example, assuming station 112 is identified by address 2, a service request sequence may consist of a data character sequence represented by the following symbols:

2*0# where "2" designates the station address, "*" comprises the address delimiter, "0" is the "select" service request (code) and "#" symbolically represents the end-of-message (ETB) character which defines the end of the service request sequence.

In response to the sync characters, multipoint control unit 152 sends the restraint bytes downstream and sends the dial tone bytes upstream as previously described. Control location 104 now sends the service request sequence, such as the sequence noted above, and multipoint control unit 152 now proceeds to send the housekeeping and control bytes necessary to select the multipoint branch extending to station 112. More specifically, multipoint control unit 152 sends the test alert (TA) byte to alert multipoint junction unit 129 that a selection sequence is being initiated. Multipoint junction unit 129 in response thereto, goes into a preliminary selection mode, blocks all its branches returning the TA byte back to multipoint control unit 152, advising it that the multipoint junction unit has gone through this preliminary selection mode.

Multipoint control unit 152 continues the sequence by sending the MA byte and multipoint junction unit 129, in response thereto, returns the HID byte to identify the multipoint junction unit. The branch selection byte identifying the branch to be selected, which in this case is branch BR4, is now transmitted by multipoint control unit 152 and multipoint junction unit 129 prepares to unblock this branch and returns the branch selection byte to multipoint control unit 152. It is noted that multipoint control unit 152 has been monitoring these responses to confirm that the appropriate branch of the appropriate multipoint junction unit is being selected.

Multipoint control unit 152 now sends the UMC byte and, at multipoint junction unit 129, the selected branch is unblocked rendering it transparent to upstream and downstream data and rendering the junction unit unresponsive to any subsequent selection codes. All other branches remain blocked precluding the transmission of upstream or downstream data through the blocked branches.

To select the branch extending to station 112, multipoint control unit 152 sends a second selection sequence immediately, which sequence is passed by multipoint junction unit 129 to branch BR4 and then by way of multiplexer/demultiplexer 132, trunk 108, multiplexer/demultiplexer 133 to the main branch BR0 of multipoint junction unit 134.

Since branch BR1 of multipoint junction unit 134 constitutes part of the path that eventually extends to station 112, the second selection sequence would constitute the TA and MA bytes, the branch 1 selection code and the UMC byte. Branch 1 of multipoint junction unit 134 is thereby selected and unblocked in the same manner as branch 4 of multipoint junction unit 129 is selected and unblocked, with multipoint junction unit 134 returning the same responses to multipoint control unit 152. Multipoint control unit 152 is thereby connected through hub office 109 and local office 111 to station 112 whereby the station receives the UMC bytes, advising station 112 not to initiate transmission. All other branches remain blocked so that no other stations can receive data or transmit data into the network.

Multipoint control unit 152 during these two selection sequences, has been monitoring and checking the responses from the various multipoint junction units. In the event that the selections have been successful and the responses correctly received, multipoint control unit 152 sends upstream control signals advising control location 104 that it is connected to station 112 and then goes transparent to upstream and downstream data. In the event, however, that the responses from the network indicate that connection has not been completed, multipoint control unit 152 sends an error message upstream for display in the control circuit equipment of control location 104 indicating the failure of the attempted connection. Advantageously, this error information can also be sent to local equipment (not shown) in hub office 101 for recording and displaying thereat. After returning the error message upstream, multipoint control unit 152 proceeds to send idle codes both upstream and downstream. This has the effect of dropping the network back to the initial idle condition.

If station 112 is correctly selected as described above and multipoint control unit 152 is rendered transparent, communication proceeds between control location 104 and station 112. When the communication is complete, control location 104 goes on-hook and office channel unit 125 sends idle bytes into the network and multipoint control unit 152 sends idle bytes upstream and downstream. The multipoint junction units, in response to the idle bytes, drop the selected connections and restore to their initial (broadcast) conditions to thus return the network to the idle mode.

If control location 104 desires to block a network branch (which may extend to a remote station or alternatively may extend by way of a downstream multipoint junction unit to a group of stations), the sync characters are transmitted to the network (as described for the initiation of the select mode) followed by the service request sequence that identifies the address of the station or group of stations and the "blocking" service request code. For example, assuming that control location 104 desires to block the branch extending to station 112 (identified by address 2), a blocking service request sequence would constitute the following data characters:

2*1# where "2" designates the station address, "*" comprises the address delimiter, "1" is the "blocking" service request code and "#" represents the end of the service request sequence.

In response to the sync characters, multipoint control unit 152 sends the restraint bytes downstream and sends the "dial tone" upstream, as previously described. Control location 104 now sends to multipoint control unit 152 the "blocking" service request sequence, such as the sequence noted above, and multipoint control unit 152 interchanges housekeeping bytes with the network to block the multipoint junction branch extending to station 112, which branch as previously noted is branch BR1 of multipoint junction unit 134 as detailed below. Initially, multipoint control unit 152 sends a first selection sequence comprising the TA byte to alert multipoint junction unit 129 that a selection sequence is being initiated followed by the branch 4 selection code and the UMC byte. Multipoint junction unit 129, in response to these codes, goes to its selection mode returning the TA byte, its HID byte and the branch selection byte followed by the selection of branch 4 to render it transparent to upstream and downstream data and thereupon rendering itself unresponsive to any subsequent selection codes.

To block the branch extending to station 112, multipoint control unit 152 next sends a second selection sequence which provides the blocking function, which sequence is passed by multipoint junction unit 129 to branch BR4 and thus to main branch BR0 of multipoint junction unit 134. Since branch BR1 of multipoint junction unit 134 eventually extends to station 112, the blocking selection sequence would constitute the TA and MA bytes, the branch 1 selection code, the BL byte and the UMC byte. Branch 1 of multipoint junction unit 134 is thereby blocked with multipoint jumction unit 134 returning the responses to multipoint control unit 152 in the same manner as was returned by multipoint junction unit 129. Multipoint control unit 152 during this blocking selection sequence has been monitoring and checking responses from multipoint junction unit 134. Under the assumption that the responses have been correctly received, multipoint control unit 152 sends back downstream idle bytes restoring multipoint junction units 129 and 134 to the initial (broadcast) condition. Of course, multipoint junction unit 134, although returned to its initial condition, maintains its branch BR1 in the blocked condition, whereby multipoint junction unit 134 is transparent to both upstream and downstream data through all of its branches with the exception of branch BR1. Multipoint control unit 152 thereupon sends the restraint signals downstream, which signals are now broadcast throughout the network (with the exception of the blocked branch) to advise the unblocked stations of an imminent message from control location 104. At the same time, multipoint control unit 152 sends upstream control signals advising control location 104 that the branch to station 112 is blocked and the multipoint control unit then goes transparent to upstream and downstream data.

When control location 104 desires to unblock the blocked branch, it initially sends the sync characters followed by an unblocking service request sequence that identifies the station or group of stations and the "unblocked" request code. For example, to unblock station 112 (identified by address 2) a service request sequence may consist of the following data characters:

2*2# where the initial "2" designates the station address and the subsequent "2" is the "unblock" service request code.

In response to the sync characters, multipoint control unit 152 again sends the restraint bytes downstream, sending the dial tone upstream as previously described. Control location 104 now sends the above-identified blocking service request sequence and multipoint control unit 152 now proceeds to send the appropriate housekeeping (and control bytes) necessary to select branch BR4 of multipoint control unit 129 in the same manner as previously described. When branch BR4 is selected and rendered transparent to upstream and downstream data, multipoint control unit 152 sends a second "unblocked" selection sequence, which sequence is passed through branch BR4 of multipoint junction unit 129 to the main branch BR0 of multipoint junction unit 134. This second "unblocked" selection sequence constitutes the TA and MA byte, the branch 1 selection code and the UMC byte. Branch 1 of multipoint junction unit 134 is thus selected to be unblocked with multipoint junction unit 134 returning the appropriate responses to multipoint control unit 152. Multipoint control unit 152, having been monitoring and checking the responses, now sends the idle bytes downstream, returning the multipoint junction units 129 and 134 to their initial idle (broadcast) mode, thus returning the network now including BR1 to the idle condition. Multipoint control unit 152 sends upstream control signals advising control location 104 that the network has been restored and then goes transparent to upstream and downstream data.

Figure 2:
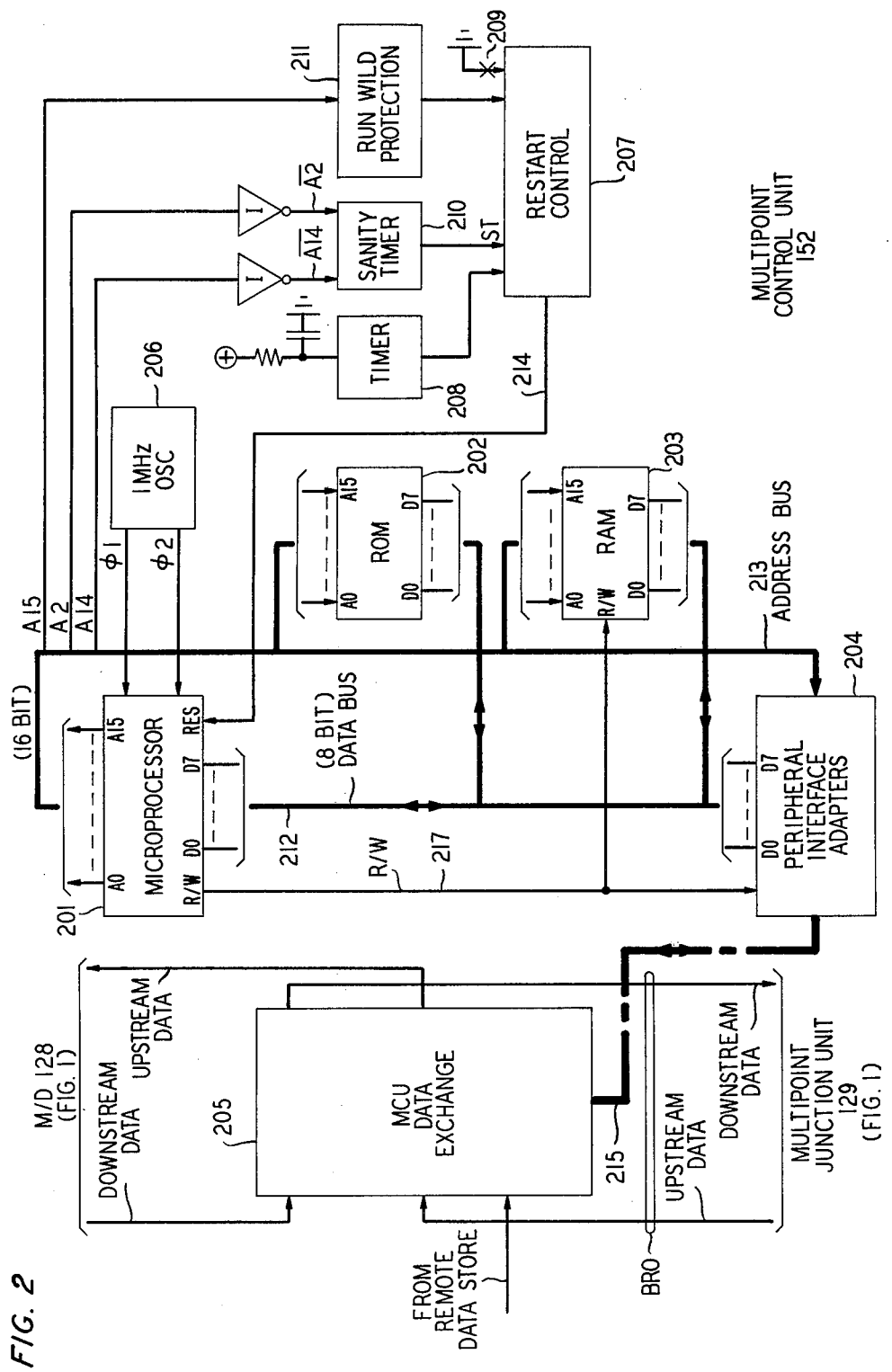
FIG. 2 shows, in schematic form, the details of a multipoint control unit in accordance with this invention.
Figure 3:
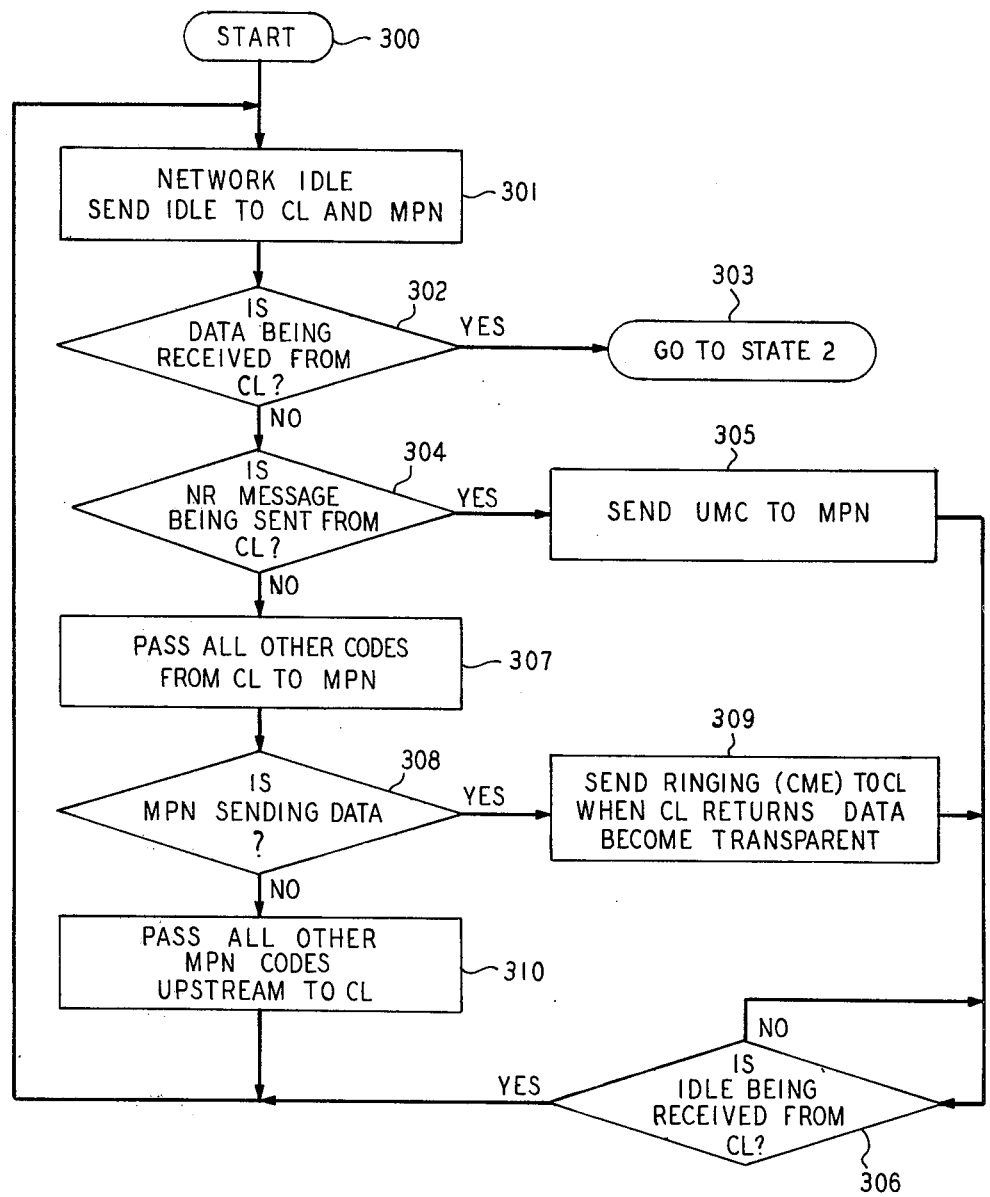
FIGS. 3 and 4 depict flow diagrams of processes followed by the control unit processor for configuring the network and interchanging data with the network and the control location.

Multipoint control unit (MCU) 152 generally includes, as shown in FIG. 2, data exchange circuit 205, processor (CPU) 201, random access memory (RAM) 203, read-only memory (ROM) 202, peripheral interface adapter (PIA) 204, (1 megahertz) oscillator 206 and restart control 207. CPU 201 is a processor which may advantageously comprise the Motorola 6800 microprocessor, which microprocessor is clocked by 1 megahertz oscillator 206, communicates data signals by way of a two-way data bus generally indicated by bus 212, sends address signals over an address and control bus generally indicated by bus 213. In addition, CPU 201 is arranged to be reset to an initial condition in response to a restart signal applied to a restart port by way of lead 214. Associated with CPU 201 and connected to data and address buses 212 and 213 are the above-described PIA 204, ROM 202 and RAM 203.

Data exchange circuit 205 provides the two-way communication upstream and downstream with multipoint junction unit 129 and multiplexer/demultiplexer 128. Circuitry in data exchange circuit 205, described in detail hereinafter, is generally arranged to accept downstream data from multiplexer/demultiplexer 128 and upstream data from multipoint junction unit 129 and apply this data via two-way bus 215 to PIA 204. Under control of signals derived from PIA 204 via bus 215, data exchange circuit 205 is arranged to pass this upstream and downstream data therethrough on to multiplexer/demultiplexer 128 and multipoint junction unit 129 (thus rendering MCU 152 transparent) or, alternatively, to inhibit passage of this data and to accept other data from PIA 204 via bus 215 and pass this other data upstream and/or downstream. In addition, data exchange circuit 205 is arranged to accept data from a remote data store (not shown) and pass this data to PIA 204.

Peripheral interface adapter (PIA) 204 contains interface circuitry (described in further detail hereinafter) which is controlled by signals on address bus 213 and data bus 212 together with a "write" signal on lead 217 to accept the upstream and downstream data received by data exchange circuit 205 and write this data onto data bus 212. PIA 204 is also arranged, in response to address and data signals from CPU 201 and a "read" signal on lead 217, to signal data exchange circuit 205 via bus 215 to inhibit the passage of upstream and downstream data and to substitute therefor other data which PIA 204 reads on data bus 212, which other data is alternatively passed upstream or downstream by data exchange circuit 205.

The resetting or restarting of microprocessor 201 is controlled by restart control 207 via lead 214. Restart control 207, in turn, is controlled by timer 208, manual switch 209, sanity timer 210 and run wild protection circuit 211. Timer 208 comprises a conventional timer, which times out a predetermined interval after power is initially applied thereto. The time-out of timer 208 provides a signal to restart control 207 after power is initially turned on for the system. Similarly, operation of manual switch 209 provides a corresponding signal to restart control 207. Sanity timer 210 advantageously comprises a resettable timing circuit which monitors address leads A2 and A14 of address bus 213. Pulsing of these leads should occur periodically (i.e., every 1.1 seconds), which pulsing resets the timing circuitry. Absence of this pulsing permits sanity timer 210 to time out to provide a signal to restart control 207. Run wild protection circuit 211 monitors address lead A15. The condition of this lead should not change. A change thereof results in run wild circuit 211 signaling restart control 207. In any of the above events, restart control 207 passes a restart signal by way of lead 214 to the restart input port of CPU 201 to thereby reinitialize the microprocessor.

ROM 202 is a conventional read-only memory having eight rows of four K bits of storage, which storage includes the various instructions for algorithms for processing the downstream data received from the control location and the upstream data received from the network. These algorithms include various instructions for determining bytes and code sequences to be sent to the network or to be sent to the control location, for assembling the various bits of the message characters imbedded in the upstream and downstream bytes and storing the assembled characters and, when appropriate, for instructing MCU 152 to be transparent to the upstream and downstream data. The stored instructions are obtainable by CUP 201 by appropriate address signals on address bus 213, which instructions are thereby applied by ROM 202 to data bus 212.

RAM 203 is a conventional random access memory capable of storing eight rows of 512 bits and applying the signals to be stored onto data bus 212 or reading the signals applied to data bus 212 by RAM 203. Information is written into RAM 203 and read out of this memory by CPU 201 providing appropriate address signals to address bus 213 and a "write" or "read" signal to lead 217. Functions of RAM 203 include semi-permanent storage of a network "mapping" and temporary storage of message data characters. The network "mapping" is inserted in RAM 203 prior to the initiation or starting up of the network. The network "mapping" is conventionally obtained from a a remote data store via data exchange circuit 205 and PIA 204 and inserted into a predetermined location of RAM 203. This network "mapping" advantageously includes a digital representation of each station (or group) address in the network and associated therewith a digital representation of the number of junction units to be selectively signaled and the multipoint junction unit branch or sequence of multipoint junction branches which must be selected to access the represented station or group of stations. Thus, a "mapping" for station 112 would comprise the digital "2" representation for the station address, the digital "2" representation for the number of junction units, namely units 129 and 134 (to be selectively signaled) and the digital representations for branches BR4 and BR1.

The algorithm followed by MCU 152 for processing the upstream and downstream data and generating and transmitting characters and control sequences to the control location and into the network to place the network in a broadcast mode and select a branch line can be more readily understood by one having reasonable skill in the art by referring to the flow charts and instruction lists disclosed in FIGS. 3 to 17.

The network operation may be started or initiated in any conventional manner which places microprocessor 201 in an initial condition placing, in turn, the various peripheral units in a corresponding initial condition. At this point, since the network is idle, the process is in the "start" state 300, idle bytes are being transmitted downstream from the control location and are being transmitted upstream from all of the remote stations. Under this condition, CPU 201 addresses ROM 202 to obtain a sequence of instructions defining an initial "network idle" subroutine symbolically shown as block 301 in FIG. 3. In accordance with these instructions, CPU 201 examines the downstream byte and, so long as it is idle, addresses peripheral interface adapter (PIA) 204 and sends to it an idle byte for transmission downstream. At the same time, upon recognition of an upstream idle byte, CPU 201 similarly addresses PIA 204, applying an idle byte thereto for transmission upstream to the control location. This condition is maintained so long as downstream and upstream idle bytes are being received by bus 213 and sends "read" or "write" signals over lead 217.

Assume now that a byte other than idle is received by the MCU. The process thereupon advances to decision 302. In accordance with this decision, CPU 201 obtains a sequence of instructions from ROM 202 to ascertain if the downstream data from the control location contains data characters. If data characters are being received, the process goes to state 2, symbolically shown as state 303 and described in detail hereinafter in FIG. 4. In the event, however, that the downstream byte does not contain data characters, the process advances to decision 304.

In decision 304, determination is made as to whether a "not ready" (NR) control code byte is being received in the downstream data from the control location. Assuming that the "not ready" byte is being received, the process advances to subroutine 305 wherein the microprocessor 201 will generate a "restraint" signal which constitutes a "UMC" control code byte, sending it via the data bus to PIA 204 with instructions for data exchange circuit 205 to distribute the bytes downstream to the various remote stations advising them that the control location is not prepared to communicate with them. Thereafter, the process advances to decision 306 which determines when idle bytes are again received in the downstream data from the control location. When these downstream idle bytes are again received, the process again advances back to Start 300 and, more specifically, back to network idle subroutine 301.

Assume now that the "not ready" byte is not being received in the downstream data from the control location. With the process in decision 304, it advances to subroutine 307 wherein PIA 204 is advised by CPU 201 to pass appropriate control signals to data exchange circuit 205 to pass all other downstream codes from the control location to the network and then to the remote stations on the multipoint network. (This advice by CPU 201 constitutes the application of predetermined data to data bus 212 together with an appropriate address on address bus 213 identifying circuitry in PIA 204 which provides appropriate control bits for transfer to data exchange circuit 205 via bus 215). These control bits result in the removal of an inhibiting signal for downstream data and this removal of the inhibiting signal permits the downstream data byte to be shifted through data exchange circuit 205 on downstream into the network, as described in further detail hereinafter.

With data exchange circuit 205 proceeding to pass the downstream code into the multipoint network, the process advance to decision 308 where it determines whether the upstream byte from the multipoint network has data characters imbedded therein. In the event that the upstream data constitutes data bytes, the process advances to subroutine 309. In accordance with this subroutine, CPU 201 generates the ringing (CME) control code byte. CPU 201 then addresses the appropriate circuit in PIA 204, applies a "read" signal to lead 217 and applies the CME byte to the data bus. This CME byte is then passed to data exchange circuit 205 and transmitted upstream to the control location.

CPU 201 now awaits the response of the control location which presumably will respond to the remote station by returning data characters. Upon recognition of these data characters coming downstream, CPU 201 provides appropriate control information to PIA 204 to remove the inhibiting signal for upstream data in the data exchange circuit 205, thereby making the MCU transparent to upstream and downstream data. The process then advances to decision 306 which monitors the downstream idle bytes from the control location. As described above, when the idle bytes are received in the downstream data, the process advances back to Start 300 and, more specifically, to network idle subroutine 301.

In the event that CPU 201, when at decision 308, determines that the upstream byte does not constitute data, then the process advances to subroutine 310. In accordance with this subroutine, CPU 201 provides appropriate control information to PIA 204 permitting PIA 204 to remove the inhibiting signal for upstream data in data exchange circuit 205 and thus permit the passage of the upstream bytes to the control location. At this point, the process then returns to the Start 300 state and, more specifically, to network idle subroutine 301.

Figure 4:
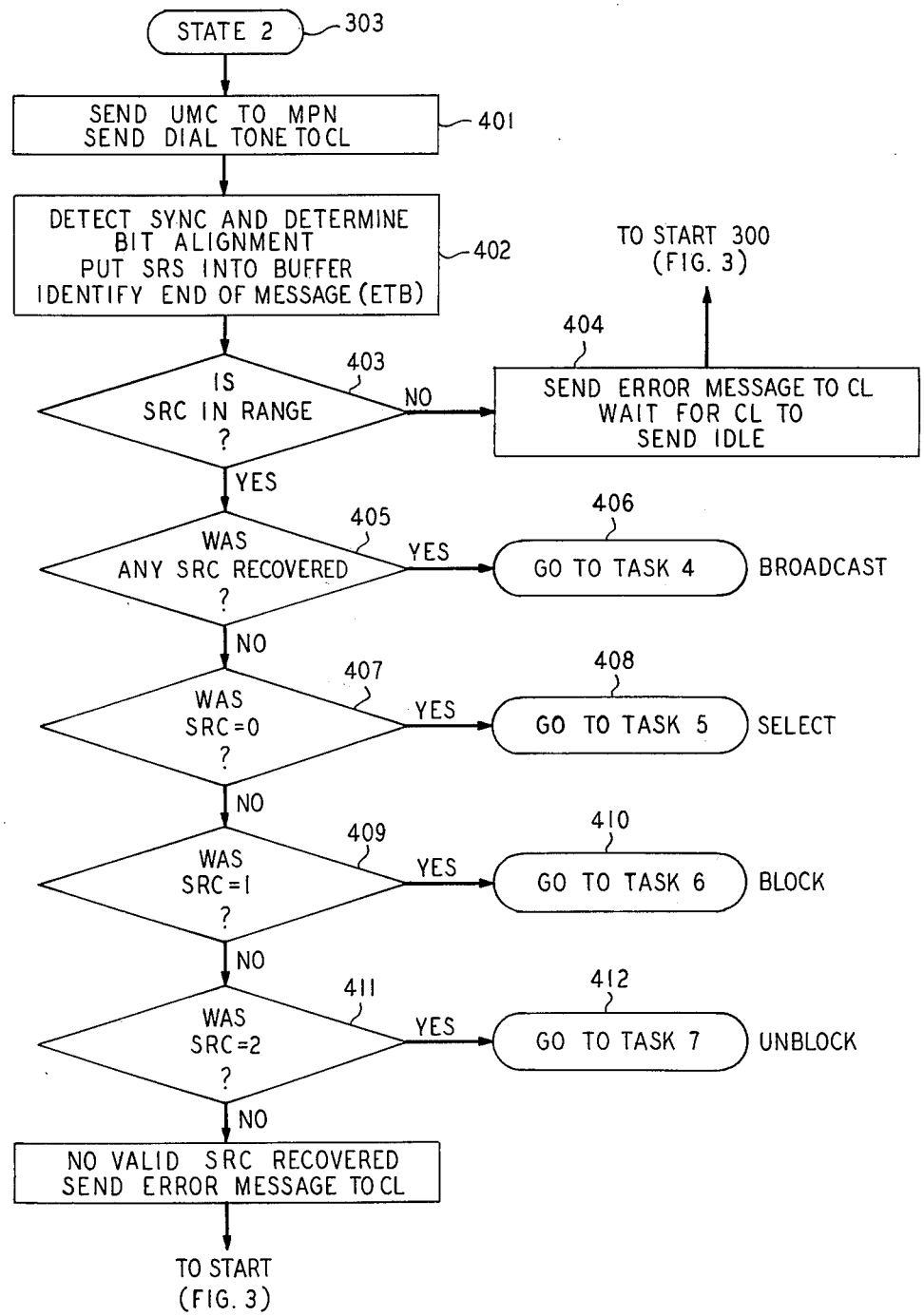

Assume now that data is being received from the control location and the process has advanced to state 2. This advances the process to subroutine 401 (FIG. 4). Under this condition, CPU 201 obtains from ROM 202 a set of instructions to generate the "UMC" byte and pass the byte to the appropriate equipment in PIA 204 for controlling data exchange circuit 205 to transmit the byte downstream to the multipoint network. This advises the remote stations to withhold transmission since the control location is about to send a message or reconfigure the network. CPU 201 also obtains instructions from ROM 202 to generate the CSA (dial tone) byte, which byte will be sent to PIA 204 to control data exchange circuit 205 to transmit the byte upstream to the control location. The process then advances to subroutine 402.

In subroutine 402, CPU 201 monitors the downstream bytes looking for synchronizing characters from the control location, which characters will be transmitted when the control location goes "off-hook." In accordance with subroutine 402, CPU 201 detects the sync character pattern and bit aligns itself with these characters coming downstream in the bytes, placing these bit aligned characters into a message buffer in RAM 203. This routine may be provided in any conventional manner. Advantageously, as noted above, the routine for providing this alignment may be of the type described in the R. R. Seibel application. This routine, as described in the Seibel application, is terminated by the recognition of the end-of-message (ETB) character which normally concludes the service request sequence. As a consequence, the message buffer in RAM 203 at the termination of this subroutine has stored therein the service request sequence received from the control location. At this point, the process advances to decision 403.

In decision 403 CPU 201 obtains instructions from ROM 202 to determine if the service request code is in the appropriate range. As described above, if the service request is to broadcast a message, there is no service request code in the sequence whereas, if the service request is to select, block or unblock, the service request code constitutes one of digits 0, 1 or 2. If none of these conditions exist, CPU 202 advances the process to subroutine 404. In this subroutine, an appropriate error message is generated by CPU 201 for application to PIA 204 and consequent transmission upstream to the control location for display thereat. Presumably, when the control location becomes aware that there is an error in the service request sequence, it will "hang-up" to thereupon send idle byte downstream and CPU 201, upon recognition of these idle bytes, advances the process back to Start 300.

If CPU 201, at decision 403, determines that the service request code is within range, the process is advanced to decision 405. In accordance with decision 405, CPU 201 decides if a service request code has been received. In the event that no code has been received, the process goes to task 4 which constitutes the broadcast task 406.

A list of "instructions" obtained from ROM 202 for the routines of task 4 (which constitute the broadcast task) accompanied by "labels" and "remarks" for the various instructions are shown in FIG. 5. Accordingly, assuming that no service request code has been received and the process thereupon goes to task 4 (broadcast task 406), as described above, the instructions for a routine identified in FIG. 5 by the label NOSRC are obtained from ROM 202. These instructions to CPU 201, as seen in FIG. 5, constitute the insertion of a "flag" in a predetermined memory area of RAM 203, which flag will be used in a subsequent routine to eliminate any end-of-call signaling sequence that instructs downstream multi-point junction units to drop any selected connections. The process thereupon jumps to the subroutine labeled CONCON (FIG. 6).

When the process enters routine CONCON, CPU 201 obtains from ROM 202 instructions for a subroutine for generating acknowledgement (ACK) characters for application to PIA 204 with address and data signals indicating that these characters are to be transmitted by data exchange circuit 205 back upstream to the control location to thereby acknowledge proper receipt of the broadcast service request. The control location 104 presumably now starts to send data. The CONCON routine continues with instructions for loading an initializing number into a RAM memory location (which number will be subsequently used by a routine labeled CHKIN for counting incoming bytes) and instructions for loading an appropriate code in this RAM memory location so that the CHKIN routine will monitor for downstream idle and "not ready" bytes. At this point, the process advances to the S2S1P1 routine which includes instructions for generating "DME" bytes for each upstream idle byte received from the network and further includes a subroutine for sending the "DME" bytes upstream to the control location so that the control location receives data "fill" characters rather than "idle" characters and will not terminate the (broadcast) call. When the process completes this task (for each byte), it advances to a routine labeled S2S1P2 whose first instruction is to jump to the CHKIN subroutine.

Subroutine CHKIN is shown in FIGS. 7 to 9, when vertically aligned. It is the principal functions of this subroutine to identify upstream and/or downstream bytes priorly selected for monitoring by the microprocessor routine CONCON and determine whether any one of these bytes are repeatedly received by counting the reception of the byte until the priorly identified initializing number of these consecutive bytes are received. Upon the reception of this number of consecutive bytes, further parts of the process will be advised that the identified byte is being appropriately received on the upstream or downstream branch.

Subroutine CHKIN has the capability of monitoring for upstream and downstream data bytes and for idle bytes (from either the remote stations or the control location) or additionally of monitoring for downstream "not ready" or DME bytes (from the control location). All other supervisory or housekeeping bytes that may be on the network are not monitored and are hereinafter referred to as "non-active". The routine is initialized as shown in FIG. 7 by clearing a predetermined pair of cells in RAM memory which define whether the previously received byte was non-active. The next several instructions involve a loop for determining whether the incoming bytes are available in PIA 204 and, in the event that the bytes are available, they are thereupon read out and placed in RAM 203.

The next instructions for subroutine CHKIN involve the examination of that portion of the memory which defines whether the previous byte was non-active. In the event that the previous bytes (upstream and downstream) were active, the process branches down to the subsequent instruction labeled ACTIVE. Alternatively, if the previous upstream byte from the network was non-active, the process branches to the instruction labeled NONACT. Finally, if the previous downstream byte from the control location was non-active, the process prepared the new byte for examination and then branches down to the ACTIVE instruction. The effect of these instructions is to permit non-active housekeeping bytes to pass upstream and downstream through the network and to stop upstream and downstream active bytes for examination.

It is recalled that when, in this case, subroutine CHKIN was initialized, the portion of the RAM memory storing the flag indicating whether a byte was non-active had been cleared, thereby indicating that the prior byte was active. The process therefore advances to the ACTIVE instruction without stopping the new byte.

Starting at the ACTIVE instruction, CPU 201 obtains a sequence of instructions from ROM 202 to determine the codes that will be checked and, upon determining that idle bytes are to be monitored, loading an idle byte in a register for comparison with the incoming downstream byte from the control location. If the incoming downstream byte does not constitute an idle byte, the process then branches down to the instruction labeled ADMNR. Alternatively, if any idle byte is received, the CHKIN counter is decremented and the process recycles back to the beginning of subroutine CHKIN (under the assumption that the counter has not decremented to "0"). Assuming that "idle" bytes are continuously received, this loop is continued until the counter is decremented to "0" whereupon the address of the next state is loaded into RAM 203, which state is defined as the previously defined network idle state 301. The process now jumps to the instruction labeled SWBRK (FIG. 9), which instruction directs the process back to the main routine which in this case is subroutine CONCON. Subroutine CONCON will now terminate the call in a manner described hereinafter.

In the event that the downstream bytes received from the control location are "not ready" bytes, the process advances from the ACTIVE instructions to the instruction labeled ADMNR, as described above. In this event, the incoming downstream byte from the control location is examined to check if it is a "not ready" byte in the same manner as the idle byte was checked. In the event that the downstream byte is a "not ready" byte, the CHKIN counter is decremented (see FIG. 8) and the process loops back to the initial instruction for subroutine CHKIN. This process then continues through the loop until the counter is decremented to "0" whereupon the address of the "not ready" subroutine (305) is inserted in RAM 203. The process then jumps to the routine SWBRK which leads the process to the main program or, more particularly, to subroutine CONCON at which point, as described in further detail hereinafter, routine CONCON places the program in "not ready" subroutine 305 where, as previously described, the "UMC" control code byte is distributed to the various remote stations.

Under the present condition, it has been assumed that the control location has made a service request to broadcast data. Under this assumption, it is presumed that the control location is sending data downstream to the various stations. In this event, MCU 152 is receiving data codes and, when a data byte is received (with the CHKIN subroutine at the ADMNR instruction), CPU 201 determines that the downstream byte constitutes a data byte. As previously described, subroutine CHKIN was not instructed to count data bytes. Accordingly, the process advances to the instruction labeled NETWRK (FIG. 9).

The instructions starting with the instruction labeled NETWRK require the examination of the upstream data byte from the remote station. Upon determination, however, that this data byte is not to be checked, the process advances to the instruction SWOPEN. The process thereupon resets the CHKIN counters, advances to the instruction SWBRK and thereupon returns to the main program and, more specifically, to subroutine CONCON.

The process, upon returning to subroutine CONCON, specifically returns to the instruction labeled S2S1P2. Assuming that the incoming downstream byte from the control location is a data byte, the instructions subsequent to the S2S1P2 instruction direct the microprocessor to jump to the subroutine CONADM (FIG. 10). In accordance with subroutine CONADM, a determination is made as to whether the peripheral hardware is in the read or write cycle and, when it is in the write cycle, microprocessor 201 instructs the peripheral hardware to shift the incoming downstream byte through data exchange circuit 205 and thus on to the multipoint junction unit network rendering MCU 152 transparent to the downstream data byte. Alternatively, in the event that the downstream byte is a control code byte, microprocessor 201 is instructed to block the byte and send a UMC byte representing a data fill to the network and branch past the CONADM subroutine. In either event, the process now checks the upstream byte and, if this byte is a data byte, the process jumps to the CONNET subroutine (FIG. 11). In accordance with the CONNET subroutine, a determination is made as to whether the peripheral hardware is in the read or write mode. When it is in the write mode, data exchange circuit is instructed to pass the upstream byte onto the control location, thus making MCU 152 transparent to upstream data. Alternatively, if the upstream byte is a control byte, a DME byte is passed upstream as a fill character and the CONNET subroutine is not entered. The process then loops back to the S2S1P2 instruction.

This cycling of the process is continued during the broadcast data call while data bytes are distributed downstream by control location 104. Upon the termination of the call, however, control location 104 hangs up and idle bytes are sent downstream to MCU 152. These idle bytes are recognized by the CHKIN routine, and more specifically by the portion of the routine starting with the ACTIVE instruction. As seen in FIG. 7, after the ACTIVE instruction, the process checks if the byte is the idle code whereupon the CHKIN counter is decremented and the process returns to the beginning of the CHKIN routine. This loop is continued so long as idle bytes are received in a sequence until the counter is decremented to "0". When the counter is decremented to "0", the network idle subroutine (301) designation is loaded into RAM 203 and the process jumps to the instruction labeled SWBRK. At this point, the program returns to the CONCON routine and, more specifically, to the instruction following the instruction labeled S2S1P2. At this point, the process advances to the instruction in the routine CONCON labeled ENDES1. In accordance with this and the following instructions, the RAM location specifying that idle is not to be sent after hand-up is now accessed and, since idles are not to be sent, the process advances to the instruction labeled EXES1. This returns the process to task 4 (FIG. 4) in state 2. In task 4, we proceed to jump to the instruction labeled ENDS2 (FIG. 5). This instruction, in turn, jumps us to the next state as defined in RAM 203, which state was previously entered when the process was in the CHKIN routine. Since, as previously described, the state entered when the process was in the CHKIN routine is the network idle routine (301) state, the process returns to the idle routine previously described. Accordingly, the broadcast is concluded and idle bytes are distributed both upstream and downstream.

Assume now that the control location desires to select station 112 which is identified by the digit "2". Accordingly, the service request sequence

2*0# is transmitted by the control location. In this event, with the process advanced to decision 405, CPU 201 determines that a service request code (namely the digit "0") has been received and advances the process to decision 407. Since the service request code is "0", decision 407 advances the process to task 5, shown as state 408 in FIG. 4, which constitutes the select task.

A list of the instructions in ROM 202 and the accompanying labels and remarks thereof for the various instructions for the routines in task 5 are shown in FIGS. 13–17. Referring to FIG. 13, the first instructions for task 5 constitute the subroutine labeled SRCO are obtained from ROM 202. The instructions for this routine store the station address in a predetermined location in RAM 203 (defined as storage area TEMP14) and further store in a CPU register the indication that one station is to be selected by this service request. A check is then made to confirm that the service request sequence contains at least one address. In the event that a station address is not present, an error message is generated in a conventional manner as shown by subroutine SRCO and the consequent jump of the process to instruction ERR2T5. The process thereupon proceeds to go into the "hang-up" routine HANGUP (FIG. 12) described in further detail hereinafter wherein the error message is sent to the control location and the network is returned to the idle state in the manner described for the broadcast mode.

Assume now that the service request contains a station address. The stored number indicating the number of stations to be selected is returned to RAM 203 and the process advances to the instruction labeled S2T5P4. Instruction S2T5P4 and the following instructions, as shown in FIG. 13, provide the process of loading the first station address into a CPU register, which first station address constitutes the only station address for this assumed case. The process then decrements a pointer to point to the next address (there being none in this case). Instructions are now obtained from ROM 202 to search the network map in RAM 203 for the station address in the CPU register. This search involves a conventional routine for matching the station address in the CPU register with a corresponding address in the network map in RAM 203 and, upon locating a match, returning the digits defining the number of ports to be selected to a CPU register and placing the branch selection codes in RAM 203. The process now advances to the instruction labeled MTCH, which instructs the process to jump to the subroutine labeled SELECT (FIG. 14).

In accordance with the SELECT subroutine, the station address is now saved in RAM 203 and counters are set therein to define that three attempts will be made to select ports leading to the addressee station. A pointer is provided to identify the first multipoint junction unit port or branch in case a second or third attempt is required. The process then advances to the instruction labeled SELP3. The number of ports that have to be selected in order to connect to the station (which in this case is two) is set into a CPU counter which is increased and the resultant increased number (3) is placed in RAM 203. A maximum time interval for obtaining responses from the multipoint junction units is derived from ROM 202 and also placed in RAM 203. The process also produces two pointers to point to the first branch code (in this case branch 4 of MJU 129), one pointer for the use of producing and sending the branch code and the other pointer for the use of checking the branch selection code response of the multipoint junction unit. The process then clears a "TA" counter which will subsequently provide a count of the TA byte responses of the multipoint junction unit. At this point, the process advances to the statement labeled SELL1.

For instruction SELL1, the "number of ports" counter is decremented and, since this is not the last port to be selected, the process branches down to the instruction labeled SELP10. Instruction SELP10 and the subroutine subsequent thereto produces the TA byte (which is the first byte of the selection sequence) and sends out this byte to the network while, at the same time, recovers the byte coming upstream from the network and places the incoming upstream byte in a CPU register. This incoming upstream byte is checked to see if it is the TA byte response from the multipoint junction unit.

If the incoming upstream byte is a TA byte (although this byte should not yet be received), the incoming TA byte counter is incremented and the process advances to the instruction labeled SELP4. If the incoming byte is not a TA byte, the process advances to the instruction labeled SELP11 wherein the byte is examined for a branch code. Since this is the first TA byte and the branch code has not been sent and cannot be a match, the process advances to the instruction labeled SELP4.

For instruction SELP4, the MA code is generated and a conventional subroutine is provided for sending the MA byte downstream into the network. The upstream incoming byte is again placed in the CPU register to determine whether a TA byte or a branch code has been received and examined in the same manner as previously described. If a TA byte is received, the TA byte counter is incremented, otherwise the count remains the same. In either event, the process advances to the instruction labeled SELP5 (FIG. 15).

In accordance with the instruction labeled SELP5 and the subsequent subroutine, the pointer for the branch code to be sent is obtained to enable CPU 201 to get the branch code from RAM 203. The pointer is then shifted to the next branch code to be transmitted and the present branch code is sent downstream into the network while, at the same time, the upstream byte is placed into a CPU register. At this point of time, the code for port or branch 4 is transmitted downstream and the branch code pointer points to the next branch code to be transmitted which constitutes the code for port or branch 1 of multipoint junction unit 134. The received upstream byte is again checked to determine whether the TA byte or the branch code has been received.

Assume now that, in fact, the upstream byte just received is not the TA byte but does constitute the branch code byte. The process thereupon advances to the instruction labeled SELP13. This comparison involves comparing the incoming branch byte just stored with the byte in RAM 203 that is defined by the next branch code to be received pointer. The TA counter thereupon is reset, the pointer is shifted to the next branch code to be received and the count of the received branch bytes is incremented. The process then advances to instruction SELP6.

Instruction SELP6 and the subsequent subroutine develops and sends out the UMC byte and registers the incoming upstream byte. The previously described checks are made to see if the byte is a TA byte or a branch code byte with the consequent changing of the several counts if the branch code byte is received at this time rather than directly after it was transmitted, as described above. In either event, the process advances to the instruction labeled SELP7 (FIG. 16).

Instruction SELP7 instructs the CPU to return to instruction SELL1 (FIG. 14) and, as a result, CPU 201 proceeds through the process of sending out the next select sequence. Of course, the process also checks the upstream bytes and in the event that the responses from the multipoint junction unit were delayed and therefore received during this sequence, the examination of these received bytes and the consequent adjustment of the counters and pointers for the received bytes are provided in this process for this loop through instruction SELP7 in the same manner as described above.

After this second sequence has been sent out, the process again loops back to instruction SELL1. The "number of ports to be selected" counter is again decremented and a determination is made that the sequence for the last port to be selected has been transmitted. The process at this point jumps to the instruction SELP1 (FIG. 16). This and the subsequent instructions control the process to monitor for any responses from the junction units that have not yet been received. More specifically, the monitoring is for correct responses and for responses within a predetermined interval.

In the event that appropriate responses are received from all of the branches to be selected, the process advances to the instruction labeled SELP15 (FIG. 17). This instruction provides indications that the selections have been appropriately completed and advances the process to instruction SELEND.

In the event that the appropriate responses from the multipoint junction units have not yet been received, the process advances through the instructions following the instruction labeled SELP1. If, at this time, the final response (the response that the junction unit operated to select the last port) has been received, the process after advancing through the various instructions following the instruction labeled SELP1 correspondingly branches to the instruction labeled SELP15. Alternatively, if the final response has not yet been received, the process further advances to the instruction labeled SELP2, which provides delay counting to give an appropriate delay interval for awaiting the responses from the multipoint junction unit. The process, during this delay interval, advances to the instruction labeled SELP8 (FIG. 17), the branch selection code response pointer is caused to point to the code for the next branch, which code is anticipated will be next returned and the upstream bytes are continued to be monitored while the process then loops back to the instruction SELP16. This loop is continued until all of the appropriate responses are received, whereupon the process branches to instruction SELP15, as previously described.

In the event that a response is not received when the process advances to the instruction SELP2, the absence of this response results in the time out of the delay counter. Idle codes are thereupon sent to the network to restore the network to the initial idle condition and a determination is made as to whether three attempts at selection have been made. If three attempts have not been made, the process returns to instruction SELP3 and a new selection sequence is generated and sent to the network in the same manner as previously described. Alternatively, if three attempts have been made, the process advances to the instruction SELP9 and an error message is issued upstream to the control location and to the common carrier at the local hub office. At the same time, idle characters are sent downstream followed by the UMC character to restrain upstream data transmission. The process thereupon advances to instruction SELEND. Instruction SELEND returns the process to the calling task, namely, task 5. The process thereupon returns to the subroutine labeled SRCφ (FIG. 13).

When the process returns to subroutine SRCφ (FIG. 13), it enters at the instruction following the instruction labeled MTCH. At this instruction, a determination is made as to whether there was an error in the selection process. If there was an error, the process branches to instruction ERR2T5 and thereupon proceeds to go into the "hang-up" routine HANGUP (FIG. 12). In the "hang-up" routine idle codes are sent upstream and UMC codes are sent downstream. The process waits for the control location to "hang-up" by monitoring for idle codes. When the idle codes are received, the process returns to instruction JMP ENDS2 (FIG. 13) which results in returning the process to the start condition 300 and, more specifically, to the network idle state 301.

In the event that, when the process returns to task 5, entering at the instruction labeled MTCH, it is determined that another port is to be selected, the microcomputer sends idle codes into the network and the process then advances to the instruction labeled S2T5P4 to initiate the sending of the address to select the next station in the same manner as previously described for the prior station selection. Alternatively, if, as in this case, the last port had been selected, the process branches to instruction labeled S2T5P4. As a result of this, the process jumps to the subroutine labeled CONCON (FIG. 6). As previously described, subroutine CONCON monitors the interchange of upstream and downstream data and looks for a "hang-up" condition. When the control location and the stations "hang-up", the process returns the network to the idle mode by advancing to start condition 300 and, more specifically, to the network idle state 301.

Assume now that the control location desires to block station 112 which is identified by the digit "2". Accordingly, the service request sequence

2*1# is transmitted by the control location. In this event, when the process advances to decision 407, as previously described, CPU 201 determines that a service request code (namely, the digit "1") has been received and advances the process to decision 409. Decision 409, in turn, advances the process to task 6 shown as station 410 in FIG. 4, which state constitutes the block task. A list of the instructions and accompanying labels and remarks for the various instructions for the routines in task 6 are shown in Appendix A together with the instructions shown in Appendix C. In accordance with these instructions, the process controls the microcomputer to select the appropriate stations to be blocked, issues the appropriate commands to block the stations and restores the network to the idle mode by returning the process to network idle state 301.

When the control station desires to unblock station 112, the service request sequence

2*2# is transmitted by the control location. In this event, when the process advances to decision 409, CPU 201 determines that a service request code (namely, the digit "2") has been received and advances the process to decision 411. Decision 411 advances the process to task 7 shown as state 412 in FIG. 4, which state constitutes the unblock task. A list of the instructions and the accompanying labels and remarks for the various instructions for the routines in task 7 is shown in Appendix B. In accordance with the instructions in Appendix B, CPU 201 selects station 112, sends the unblock code into the network and restores the network to the idle mode returning to network idle state 301.

The details of the circuit arrangement of data exchange circuit 205 is shown in FIG. 18. The downstream data from control location 104 passed through multiplexer/demultiplexer 128 to multipoint control unit 152 is received by data exchange circuit 205 and, more specifically, by terminator circuit 1801. Terminator circuit 1801 provides the conventional functions of accepting the downstream line signals and converting the line signals to corresponding data signals for application to the input of shift register 1802.

Shift register 1802 comprises an eight-stage shift register which shifts the received data therethrough under control of clocking pulses applied to input terminal CLK. The data in the stages of register 1802 is simultaneously read out and passed in parallel to leads 1826, which leads constitute part of cable 215. The data in shift register 1802 is also shifted out serially to shift register 1803.

Shift register 1803 comprises an eight-stage shift register which clocks the received data therethrough under control of clock pulses applied to terminal CLK. In the event that an inhibiting signal is not applied to terminal INH and a load signal is simultaneously not applied to terminal LD, the received data, after being shifted through, is serially passed to driver 1804. Driver 1804 provides a conventional function of reconverting these data signals back to line signals, which line signals are then passed on downstream to the network and, more specifically, passed on down to branch BR0 of multipoint junction unit 129. Shift register 1803 alternatively loads data bits received on parallel leads 1830 from bus 215 into the stages of shift register 1803. More specifically, when a loading signal is applied to terminal LD and an inhibiting signal is applied to terminal INH, the shifting function is inhibited and data bits from leads 1830 are inserted into the appropriate stages of shift register 1803 to overwrite the data in the shift register and this new data is shifted serially to driver 1804.

In a similar manner, the upstream data from the network derived from branch BR0 of multipoint junction unit 129 is converted to appropriate data signals by terminator 1805 and clocked into shift register 1806. Shift register 1806 passes the data bits in parallel through leads 1827 to cable 215 and serially shifts the bits of the byte to shift register 1807. Shift register 1807, which is similar to shift register 1803, alternatively shifts the byte to driver 1808 or overwrites new bits on lead 1831 into the shift register stages and passes this newly loaded byte to driver 1808. In either event, the bytes are converted to appropriate line signals by driver 1808 and are passed upstream to multiplexer/demultiplexer 128 and thence to control location 104.

As previously described, data to provide network mapping for storage in RAM 203 may be derived from a remote data store, which store is not shown but may be located in hub office 101. The data from this data store is received by terminator 1809 and serially applied to shift register 1810. Shift register 1810, which is arranged similarly to shift register 1802, accepts this data and applies the bits in the stages in parallel to leads 1828 and leads 1828, in turn, extend to cable 215.

The clock pulses for the various shift registers are provided by clock driver circuit 1814. Clock driver circuit 1814 is controlled by the 64 KHz and 8 KHz office clocks and provide the appropriate clock pulses to leads 1815 and 1816. More specifically, clock pulses at the appropriate midpoints of the incoming line signals are provided to lead 1815 and lead 1815, in turn, is connected to the clock inputs of shift registers 1802, 1806 and 1810. Clock pulses, following in phase the clock pulses on lead 1815, are applied by clock driver circuit 1814 to lead 1816. Lead 1816 extends to the clock inputs of shift registers 1803 and 1807.

The loading and the inhibiting of shift registers 1803 and 1807 are controlled by transmit control circuit 1818 and transmit control circuit 1818, in turn, operates under control of the bit information on leads 1819 and 1820. As described hereinafter in detail, the control signals on leads 1819 and 1820 are produced by peripheral interface adapter circuit 204 and passed through cable 215 to provide the instructions as to whether upstream or downstream should be passed therethrough rendering the MCU 152 transparent to the signals or, alternatively, whether upstream or downstream data should be inhibited and different bytes inserted in the data. Transmit control circuit 1818 comprises conventional static logic which, in response to the bit information on leads 1819 and 1820, provide appropriate signals on leads 1821-1824. Leads 1821 and 1823 are connected to the INH terminal of shift registers 1803 and 1807, respectively, and leads 1822 and 1824 are connected to the LD terminals of the shift registers.

Figure 19:
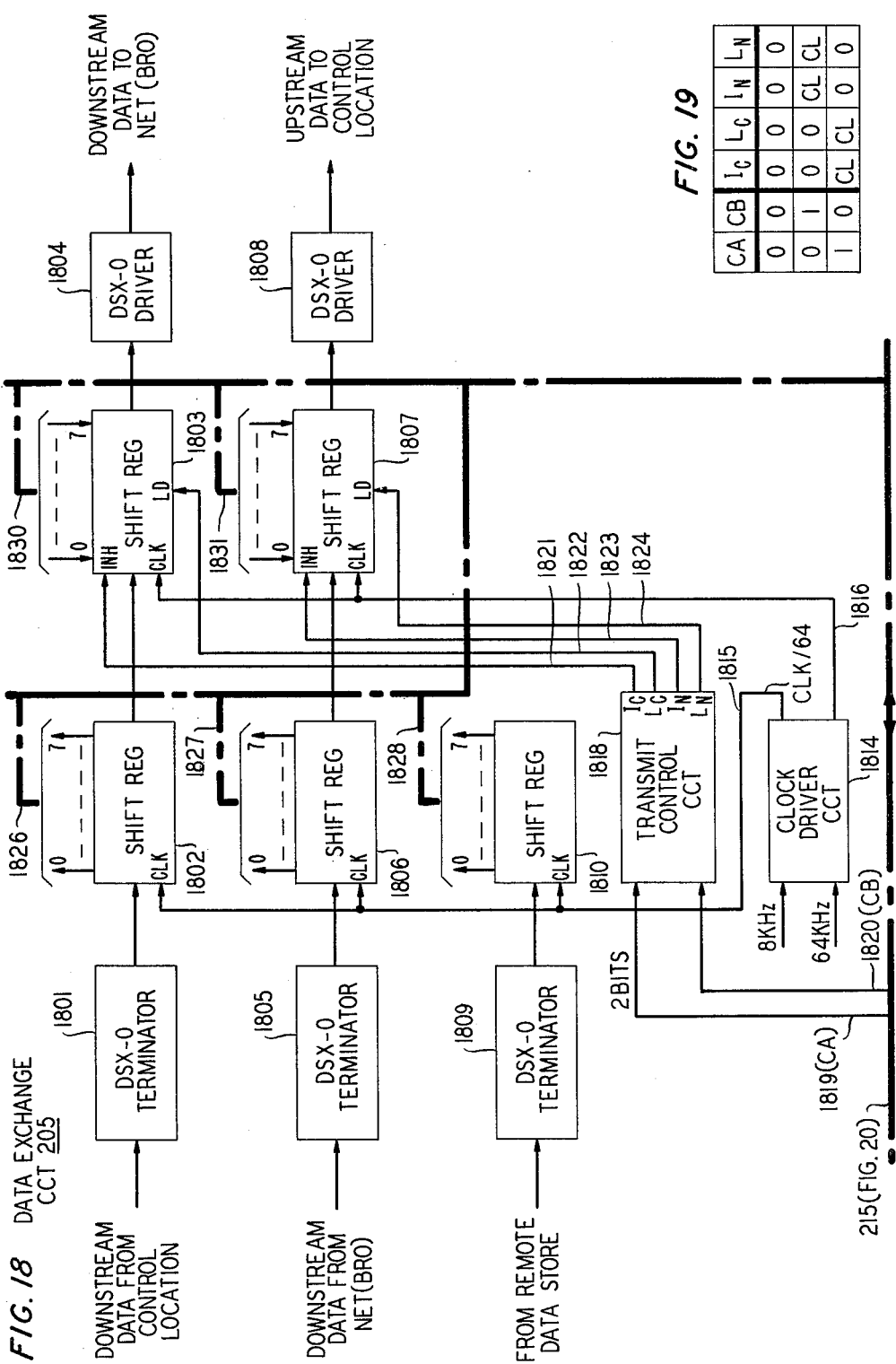
FIG. 19 discloses a truth table which identifies the logic circuitry of a transmit control circuit in the data exchange circuit.

The specific static logic circuitry of transmit control circuit 1818 is arranged to convert the bit information on leads 1819 and 1820 to the control signals on leads 1821-1824 in accordance with the truth table shown in FIG. 19. Thus, with "0" bits on leads 1819 and 1820, transmit control circuit 1818 applies "0" bits to leads 1821-1824. Accordingly, with "0" bits being applied to all INH and LD terminals of shift registers 1803 and 1807, the data from shift registers 1802 and 1806 are shifted therethrough and the MCU 152 is transparent to both upstream and downstream data.

A "0" bit on lead 1819 and a "1" bit on lead 1820 results in an inhibiting signal and a loading signal on leads 1823 and 1824. Under this situation, the upstream data is no longer passed through shift register 1807 and new bytes are overwritten (loaded) into this data stream. Alternatively, with a "1" bit on lead 1819 and a "0" bit on lead 1820, loading and inhibiting signals are applied to leads 1821 and 1822. Shift register 1803 inhibits shifting and loads the new byte, MCU 152 is no longer transparent to downstream data and new bytes are overwritten into this data.

Figure 20:
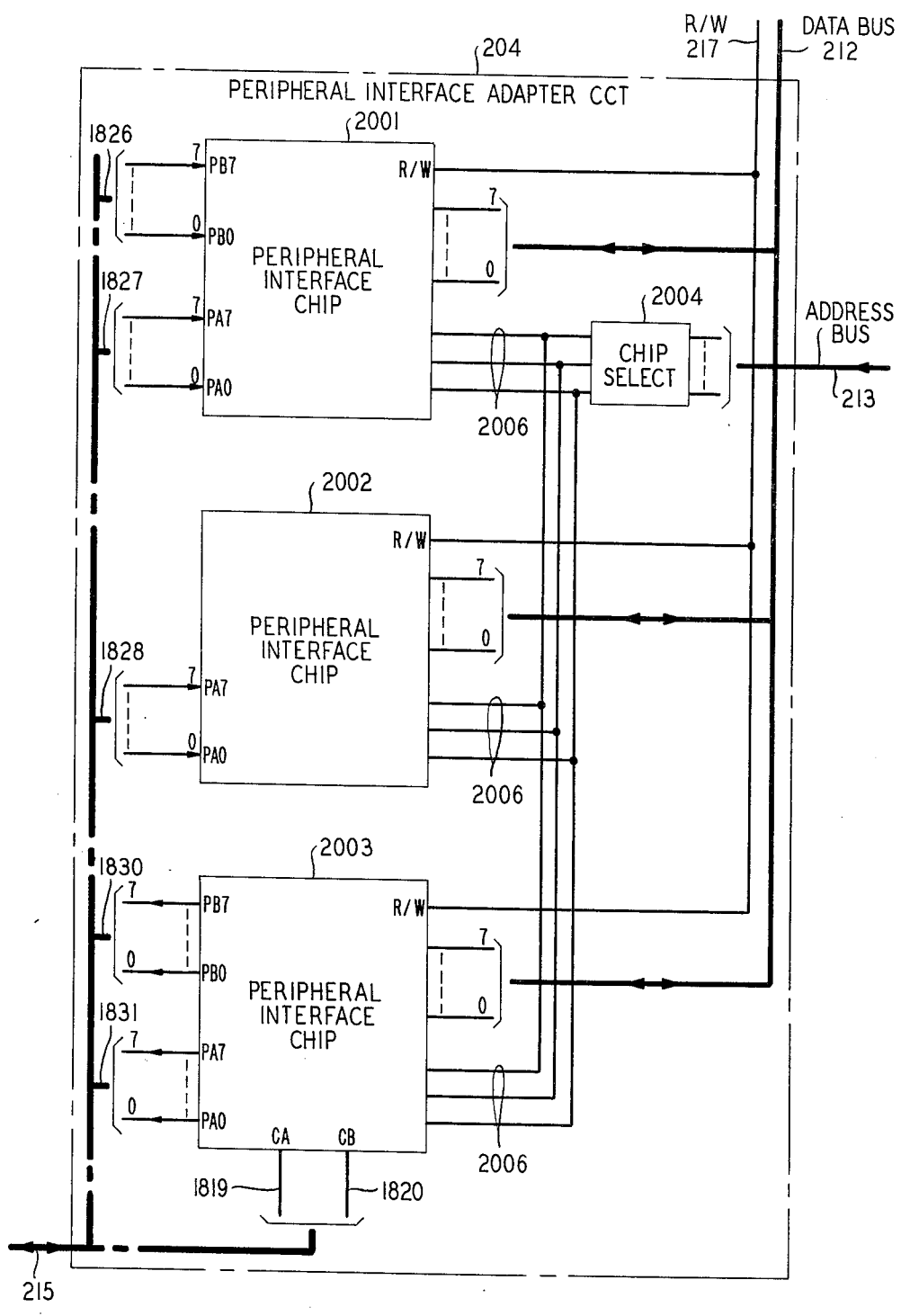
FIG. 20 shows, in schematic form, the details of the circuitry of an interface adapter used in the multipoint control unit.

The details of peripheral interface adapter circuit 204 are shown in FIG. 20. In general, this circuit comprises peripheral adapter chips 2001, 2002 and 2003 and chip circuit 2004. Chip select circuit 2004 comprises a conventional translator circuit which translates the information on address bus 213 to select one of chips 2001 to 2003. More specifically, chip select circuit 2004 applies appropriate selection signals to leads 2006, which leads extend to the select inputs of the chip circuits 2001-2003.

Chip circuits 2001-2003 comprise standard peripheral interface adapter integrated circuit chips which are programmable to provide interfaces between a plurality of leads and a bus, such as data bus 212. These peripheral interface adapter integrated circuits advantageously may comprise chip circuits, such as the Motorola, Inc. integrated circuits coded MC6820. These integrated circuits, when appropriately programmed and selected by appropriate signals on their select input terminals, transfer input and output signals between various terminals. For example, with respect to integrated circuit 2003, when selected by the appropriate signals on leads 2006 and when an appropriate read signal is applied to R/W lead 217 together with appropriate flag information in the data character on data bus 213, the information on data bus 212 is read and transferred to terminals PB0-PB7. Alternatively, when the data character on bus 212 carries different flag information, chip 2003 transfers the character on data bus 212 to terminals PA0-PA7.

Terminals PB0-PB7 are connected to leads 1830, which leads are passed in parallel through cable 215 to shift register 1803 in data exchange circuit 205 as previously described. Similarly, terminals PA0-PA7 are connected to leads 1831 and leads 1831 are passed in parallel throuch cable 215 to shift register 1807, as previously described.

Chip 2003 is also arranged in response to appropriate flag information in the data character on data bus 212 to apply various control bits to leads 1819 and 1820. As described above, the control information on leads 1819 and 1820 is passed via cable 215 to transmit control circuit 1818 in data exchange circuit 205. Accordingly, it is the principal function of chip 2003, when selected by the information on address bus 213 and enabled by a read signal on R/W lead 217, to examine the flag information in the data character on data bus 212 and thus determine whether or not shift registers 1803 and 1807 should render the MCU 152 transparent or alternatively whether registers 1803 and 1807 should block either upstream or downstream data and load new information into the "blocking" shift register.

Peripheral interface adapter integrated circuit 2001 is arranged similarly to circuit 2003 and principally functions, when selected by appropriate signals on leads 2006 and when enabled by a write signal on R/W lead 217, to examine the flag information on data bus 212 and in accordance therewith to write the information applied to either terminals PB0-PB7 or the information applied to terminals PA0-PA7 onto data bus 212. Terminals PB0-PB7 are connected to leads 1826, which are connected to stages of register 1802, while terminals PA0-PA7 are connected to leads 1827 which are connected to stages of register 1807. Accordingly, chip 2001, under instructions from microprocessor 201, writes the information in shift register 1802 or 1806 onto data bus 212. Similarly, chip 2002, when selected by signals on leads 2006 and enabled by a write signal on R/W lead 217, writes the signals applied to terminals PA0-PA7 onto data bus 212. Leads PA0-PA7 are connected to leads 1828 and, as previously noted, these leads are connected to shift register 1810. Thus, under appropriate instructions from microprocessor 201, the mapping information in shift register 1810 is written onto data bus 212.

APPENDIX A

| LABELS | INSTRUCTION | | BLOCK COMMAND REMARKS |
|---|---|---|---|
| SCR1 | LDX | | TEMP3 | FREE UP TEMP3 FOR SUBROUTINES USED HERE. |
| | STX | | TEMP14 | SAFE AREA. |
| | LDA | B | TEMP5 | FREE UP TEMP5 TOO. |
| | BNE | | *+7 | THIS SRC NEEDS ADDRESSES. ANY SENT? |
| | LDA | A | #5 | TELL ADM. TO SEND ADDRESSES. |
| | TAB | | | |
| | BRA | | ERR2T6 | ISSUE ERROR. |
| | INC | B | | ADD 1 TO MAKE LOOP COUNT RIGHT. |
| | STA | B | TEMP13 | SAFE AREA, temp$\phi$-TEMP12 USED IN SUBS. |
| S2T6P4 | DEC | | TEMP13 | ARE THERE MORE PORTS TO BLOCK? |
| | BNE | | **5 | BRANCH IF MORE PORTS. |
| | JMP | | S2T6P7 | NO MORE PORTS. NOW CONNECT ADM. TO MJU NET. |
| | LDX | | TEMP14 | GET NEXT PORT TO BLOCK. |
| | LDA | A | X | GET PORT ADDR. FROM NEW SRS STRING. |
| | DEX | | | POINT TO NEXT ADDR. FOR NEXT PASS. |
| | STX | | TEMP14 | SAVE FOR NEXT PASS. |
| | CLR | B | | SEARCH FOR ADDR. IN ACCA. |
| | LDX | | #MAPTAB | START SEARCH AT BEGINNING OF TABLE. |
| | CLC | | | CAN BE CHANGED TO CLC ($\phi$C) TO PREVENT CHECKSUMMING IN MAPPER. CHANGED BY HAND. |
| | JSR | | MAPPER | NOW GET BRANCH BYTES FROM MAP. |
| | BMI | | ERR2T6+6 | ERROR FOUND, RETURN IDLE. |
| | BNE | | *+9 | TEST IF MATCH FOUND IN MAP. |
| S2T6P3 | LDA | A | #6 | NO MATCH FOUND OR>2 DIGITS ENTERED. ISSUE CPC=6 |
| | LDA | B | #2 | |
| | JMP | | ERR2T6 | SEND CPC=62. NO ALARM/LED TO TELCO. |
| | PSH | A | | SAVE ADDR. FOR SELECT SUB. |
| | AND | A | #%11$\phi\phi\phi\phi\phi$ | A SWITCH PORT CAN NOT BE BLOCKED SINCE IT |
| | CMP | A | #%$\phi$1$\phi\phi\phi\phi\phi$ | ALREADY IS BLOCKED BY THE MCU. |
| | BNE | | *+9 | SELECT PORT IF NOT CONNECTED TO SWITCH. |
| | LDA | A | #6 | SWITCH PORT SELECTED. SEND CPC=63. |
| | LDA | B | #3 | |
| | JMP | | ERR2T6 | SEND CPC AND HANGUP. |
| | PUL | A | | PASS ADDRESS ONTO BLOCK SUB. |
| | JSR | | BLOCK | BLOCK PORT NOW. ACCB=# PORTS TO SELECT. |
| | BMI | | ERR2T6+6 | BLOCK ERROR. RET. IDLE. |

APPENDIX A-continued

BLOCK COMMAND

| LABELS | INSTRUCTION | | REMARKS |
|---|---|---|---|
|  | BRA |  | S2T6P4 | AFTER PORT BLOCKED, ARE THERE ANY MORE? |
| S2T6P7 | CLR |  | TEMP11 | TELLS CONCON NOT TO SEND 27 FRAMES OF IDLE. |
|  | JSR |  | CONCON | CONNECT ADM. AND NET. CONVERT CODES AND CHECK |
|  | BRA |  | *+7 | FOR STATE CHANGE. |
| ERR2T6 | STA | A | TEMP11 | MAKES TEMP11 POS. TO SEND OUT CPC. |
|  | JSR |  | HANGUP | NOW WAIT FOR HANGUP OF ADM. |
|  | JMP |  | ENDS2 | EXECUTION EXITS TASK 5 HERE. CHANGE STATE. |

APPENDIX B

UNBLOCK COMMAND

| LABELS | INSTRUCTION | | | REMARKS |
|---|---|---|---|---|
| SRC2 | LDA | B | TEMP5 | FREE UP AND MOVE FOR LOOP COUNTING. |
|  | BEQ |  | S2RLSE | ARE THERE ANY PORTS TO RELEASE? |
|  | STA | B | TEMP13 | SAFE AREA. TEMP$\phi$ TO TEMP12 USED IN SUBS. |
|  | LDX |  | TEMP3 | FREES UP TEMP3-4 FOR SUBS. |
|  | STX |  | TEMP14 | OUTSIDE SUB. RANGE. |
| S2T7P4 | LDX |  | TEMP14 | GET NEXT PORT TO SELECT. |
|  | LDA | A | X | GET FROM NEW STRING. |
|  | DEX |  |  | POINT TO NEXT ADDR. FOR NEXT PASS. |
|  | STX |  | TEMP14 |  |
|  | CLR | B |  | SEARCH FOR THE ADDR. PART IN ACCA. |
|  | CLC |  |  | CAN BE CHANGED TO CLC ($\$\phi$C) TO PREVENT CHECKSUMMING IN MAPPER. CHANGED BY HAND. |
|  | LDX |  | #MAPTAB | START SEARCH AT BEGINNING OF TABLE. |
|  | JSR |  | MAPPER | NOW GET BRANCH BYTES FROM MAP. |
|  | BPL |  | *+5 | WAS THERE A MAPPING ERROR? |
|  | JMP |  | ERR2T7+6 | ERROR FOUND. RETURN IDLE. |
|  | BNE |  | *+9 | TEST IF MATCH FOUND IN MAP. |
| S2T7P3 | LDA | A | #6 | NO MATCH FOUND OR >2 DIGITS ENT. ISSUE CPC=62. |
|  | LDA | B | #2 |  |
|  | JMP |  | ERR2T7 | SEND CPC=62. NO ALARM/LED TO TELCO. |
|  | PSH | A |  | SAVE ADDR. FOR SELECT SUB. IF SELECT ERROR. |
|  | AND | A | #%11$\phi\phi\phi\phi\phi$ | A SWITCH PORT CAN NOT BE SELECTED BECAUSE |
|  | CMP | A | #%$\phi$1$\phi\phi\phi\phi$ | ANOTHER PROTOCOL RQD. SELECTING RELEASES PORT. |
|  | BNE |  | *+8 | SELECT PORT IF NOT CONNECTED TO SWITCH. |
|  | LDA | A | #6 | SWITCH PORT SELECTED. SEND CPC=63. |
|  | LDA | B | #3 |  |
|  | BRA |  | ERR2T7 | SEND CPC AND HANGUP. |
|  | PUL | A |  | GET ADDR. FOR SELECT SUB. |
|  | JSR |  | SELECT | SELECT PORT NOW. ACCB=# PORTS TO SELECT. |
|  | BMI |  | ERR2T7+6 | IF ERROR ACCB=NEG. |
|  | LDA | A | #27 | IF NO SEND 27 FRAMES OF IDLE TO RELEASE PORT. |
|  | STA | A | TEMP$\phi$ | PORT WAS PROBABLY PREVIOUSLY BLOCKED. |
|  | LDA | B | #IDLE1 |  |
|  | JSR |  | NOUT | SEND IDLE OUT INTO NET. |
|  | DEC |  | TEMP$\phi$ | HAVE 27 FRAMES BEEN SENT? |
|  | BNE |  | *-6 | IF NOT KEEP SENDING. |
|  | DEC |  | TEMP13 | ARE THERE MORE PORTS TO RELEASE? |
|  | BNE |  | S2T7P4 | IF YES, KEEP SELECTING. |
|  | CLR |  | TEMP11 | DON'T SEND OUT 27 |

APPENDIX B-continued

UNBLOCK COMMAND

| LABELS | INSTRUCTION | | REMARKS |
|---|---|---|---|
| | JSR | CONCON | FRAMES OF IDLE. CONNECT ADM. TO NET. |
| | BRA | *+7 | CONVERT CODES, CHECK STATE FOR CHANGE |
| ERR2T7 | STA A | TEMP11 | SEND OUT CPC INFO FIRST. |
| | JSR | HANGUP | NOW WAIT FOR ADM. TO RETURN IDLE. |
| | JMP | ENDS2 | EXECUTION EXITS TASK 7 HERE. CHANGE STATE. |

APPENDIX C

BLOCK FUNCTION

| LABELS | INSTRUCTION | | REMARKS |
|---|---|---|---|
| BLOCK | JSR | SELECT | ACCB=# PORTS TO SELECT. ACCA=ADDRESS OF PORT. |
| | BMI | ENDBLK | SELECT ERROR. EXIT. ACCB=11111111 FROM SELECT. |
| | CLR | TEMP4 | INIT. ERROR DETECTOR. |
| | STA A | TEMP3 | SAVE ADDRESS FOR TELCO IF BLOCK NOT RETURNED. |
| | LDX | #RTDELA | PORT HAS BEEN SELECTED. NOW SEND BLOCK CODE. |
| | STX | TEMP$\phi$ | DON'T SEND MORE THAN ROUND TRIP DELAY. |
| | LDA A | #9 | PORT HAS BEEN BLOCKED IF 9 FRAMES OF BL. REC. |
| | STA A | TEMP2 | RETURNED BLOCK CODE COUNTER. |
| BLKP1 | LDA B | #BL | NOW SEND BLOCK CODE TO SELECTED PORT. |
| | JSR | NINOUT | |
| | CMP A | #BL | HAS BLOCK BEEN RECEIVED. |
| | BNE | *+7 | IF NOT REC. DEC. RT. DELAY COUNTER. |
| | DEC | TEMP2 | BLOCK REC. DEC. COUNTER. |
| | BEQ | BLKP2 | IF 9 BYTES REC. BLOCKING COMPLETE. |
| | LDX | TEMP$\phi$ | BLOCK NOT REC. DEC. DELAY COUNTER. |
| | DEX | | |
| | BEQ | *+6 | ISSUE BLOCK ERROR IS COUNTER=$\phi$. |
| | STX | TEMP$\phi$ | KEEP WAITING FOR BLOCK. |
| | BRA | BLKP1 | SEND ANOTHER BLOCK CODE. |
| | LDA A | TEMP7 | RECALL THE MJU IN SEQ. THAT SHOULD RET. BLOCK. |
| | ORA A | #%$\phi\phi$1$\phi\phi\phi\phi$ | ISSUE TYPE ERROR=2 AND RET. PORT NO. SEQ. |
| | LDA B | TEMP3 | ALSO RESTORE ADDRESS OF PORT THAT WAS TO BE BL. |
| | JSR | ALRLED | NOW ISSUE PROBLEM TO TELCO. |
| | LDA A | #6 | ISSUE CPC=64 to ADM. |
| | LDA B | #4 | |
| | JSR | SNDNAK | BLOCK NOT RET. ISSUE ERROR ADM GETS CPC=64. |
| | JSR | SCPC | |
| | LDA A | #%11111111 | SAVE FOR CALLING TASK. |
| | STA A | TEMP4 | REMEMBER ERROR. SEND IDLE EVEN IF ERROR. |
| BLKP2 | LDA A | #27 | IDLE MUST BE SENT TO 1) COMPLETE BLOCKING, OR 2) RELEASE SELECTED PORTS SINCE BL. ERROR. |
| | STA A | TEMP$\phi$ | NOW FINISH BLOCKING/SEL. WITH IDLE (27 FRAMES). |
| | LDA B | #IDLE1 | SEND 27 FRAMES IF IDLE INTO MJU NET. |
| | JSR | NOUT | SENDING IDLE RELEASES SELECTED PORTS AND |
| | DEC | TEMP$\phi$ | ACTUALLY BLOCKS THE SELECTED PORT. |
| | BNE | *−6 | SEND 27 FRAMES. |
| | LDA B | #UMC | HOLD NET. UNTIL FREED BY ADM. |
| | JSR | NOUT | |
| | LDA B | TEMP4 | WAS THERE A BLOCKING ERROR? |

APPENDIX C-continued

| LABELS | INSTRUCTION | BLOCK FUNCTION REMARKS |
|---|---|---|
| ENDBLK | RTS | |

We claim:

1. A data communication system including a plurality of data switching units (129, 134, 142), each unit including means responsive to selection signals on a main line thereof (BR0) for selecting one of a plurality of branch lines thereof (BR1-BR4) for data interchange, the communication system being arranged to interconnect branch lines (BR3, BR4) of a first unit (129) to main lines of other units and to connect data sending and receiving terminals (112, 113, 116, 117) to branch lines of the other units, the communication system further including control means (152) for sending the selection signals to the first unit main line, characterized in that the control means includes means (201, 202, 203) responsive to address signals received from a remote source (104) defining each of the terminals for sending a sequence of the selection signals to select the first unit branch line connected to the main line of the other unit and to thereafter select the other unit branch line connected to the defined terminal.

2. A data communication system, in accordance with claim 1, wherein the selection signal sequence sending means includes means (203) for storing mapping information for each terminal identifying the first unit branch line connected to the main line of the other unit and identifying the other unit branch line connected to the terminal and means (201, 202) responsive to each address signal for generating selection signals to select the identified branch lines in accordance with the mapping information.

3. A data communication system, in accordance with claim 2, wherein the generating means includes means (202) for storing instructions for obtaining and processing stored mapping information and means (201) responsive to each address signal for processing the mapping information for the terminal defined by the address signal in accordance with the stored instructions.

4. A method of enabling communication between a data station and selected ones of a plurality of data terminals by way of data switching units, each of the data switching units including means responsive to selection signals on a main line thereof for selecting for data interchange therewith one of a plurality of branch lines thereof, branch lines of a first unit being connected to main lines of other units and branch lines of the other units being connected to the data terminals, comprising the steps of:

identifying the first unit branch line connected to the main line of one of the other units and identifying the one other unit branch line connected to a data terminal defined by an address signal received from the data station, and sending a sequence of selection signals to the first unit main line to select the identified first unit branch line and to thereafter select the identified one other unit branch line.

5. A method of enabling communication, in accordance with claim 4, and further comprising the step of transmissively interconnecting the data station and the first unit main line upon completion of the sequential selections.

6. A method of enabling communication, in accordance with claim 4, wherein each of the data switching units further includes means for reporting back to the main line thereof failure and success of the branch line selection, and further comprising the steps of monitoring the data switching unit reports received on the first unit main line and sending signals to the data station defining selection failure or success.

7. A method of enabling communication, in accordance with claim 6, and further comprising the step of transmissively interconnecting the data station and the first unit main line when a sequence of successful selections are reported back to the first unit main line.

8. A method of enabling communication, in accordance with claim 6, wherein each of the data switching units further includes means responsive to terminating signals on the main line thereof for terminating the branch line selection, and further comprising the step of sending terminating signals to the first unit main line when a selection failure is reported back to the first unit main line.

* * * * *